United States Patent
Kwon et al.

(10) Patent No.: US 9,568,785 B2
(45) Date of Patent: Feb. 14, 2017

(54) LIQUID CRYSTAL DISPLAY

(71) Applicant: Samsung Display Co., Ltd., Yongin, Gyeonggi-Do (KR)

(72) Inventors: Oh Jeong Kwon, Hwaseong-si (KR); Heung Shik Park, Seoul (KR); Hyeok Jin Lee, Seongnam-si (KR); Jae Hong Park, Seoul (KR); Dong-Chul Shin, Seoul (KR); Su Jin Kim, Seoul (KR); Ki Chul Shin, Seongnam-si (KR); Sung-Jae Yun, Hwaseong-si (KR); Joo Young Yoon, Suwon-si (KR)

(73) Assignee: SAMSUNG DISPLAY CO., LTD, Gyeonggi-Do (KR)

( * ) Notice: Subject to any disclaimer, the term of this patent is extended or adjusted under 35 U.S.C. 154(b) by 98 days.

(21) Appl. No.: 14/541,263

(22) Filed: Nov. 14, 2014

(65) Prior Publication Data
US 2015/0168789 A1 Jun. 18, 2015

(30) Foreign Application Priority Data
Dec. 18, 2013 (KR) .................. 10-2013-0158709

(51) Int. Cl.
G02F 1/1343 (2006.01)
G02F 1/1362 (2006.01)
G02F 1/1368 (2006.01)
G02F 1/1333 (2006.01)
(Continued)

(52) U.S. Cl.
CPC ....... *G02F 1/134336* (2013.01); *G02F 1/1368* (2013.01); *G02F 1/13306* (2013.01); *G02F 1/133345* (2013.01); *G02F 1/133512* (2013.01); *G02F 1/133514* (2013.01); *G02F 1/136286* (2013.01); *G02F 2001/133519* (2013.01); *G02F 2001/134345* (2013.01)

(58) Field of Classification Search
CPC .................... G02F 1/134336; G02F 1/136286; G02F 1/1368; G02F 1/133345; G02F 1/133514; G02F 1/133512; G02F 1/13306; G02F 2001/134345; G02F 2001/133519
See application file for complete search history.

(56) References Cited

U.S. PATENT DOCUMENTS 7,800,604 B2 9/2010 Iisaka
8,421,974 B2 4/2013 Hsieh et al.
(Continued)

FOREIGN PATENT DOCUMENTS

KR 100646778 B1 11/2006

*Primary Examiner* — Charles Chang
(74) *Attorney, Agent, or Firm* — Cantor Colburn LLP

(57) ABSTRACT

A liquid crystal display includes a first substrate, a pixel electrode which is disposed on the first substrate and includes a first subpixel electrode which is disposed at a pixel area and includes a plurality of first branch electrodes, and a second subpixel electrode which is separated from the first subpixel electrode, disposed at an outer edge of the pixel area, encloses the first subpixel electrode and includes a plurality of second branch electrodes, a second substrate facing the first substrate, a common electrode disposed on the second substrate, and a liquid crystal layer disposed between the first substrate and the second substrate, where a first voltage applied to the first subpixel electrode is larger than a second voltage applied to the second subpixel electrode.

12 Claims, 26 Drawing Sheets

(51) Int. Cl.
*G02F 1/1335* (2006.01)
*G02F 1/133* (2006.01)

(56) References Cited

U.S. PATENT DOCUMENTS

| | | | |
|---|---|---|---|
| 2009/0244425 A1* | 10/2009 | Jung | G02F 1/133753 349/48 |
| 2012/0236238 A1 | 9/2012 | Kim et al. | |
| 2012/0281174 A1 | 11/2012 | Yeh et al. | |
| 2013/0050630 A1 | 2/2013 | Jung et al. | |
| 2013/0208225 A1* | 8/2013 | Kwon | G02F 1/134309 349/144 |

* cited by examiner (a)  (b)  (c)

(a) (b) (c)

(a)      (b)      (c)

(a)　　(b)　　(c)　　(d)

LIQUID CRYSTAL DISPLAY

This application claims priority to Korean Patent Application No. 10-2013-0158709, filed on Dec. 18, 2013, and all the benefits accruing therefrom under 35 U.S.C. §119, the entire contents of which are incorporated herein by reference.

BACKGROUND (a) Field

The invention relates to a liquid crystal display.

(b) Description of the Related Art

A liquid crystal display ("LCD") is one of flat panel display devices that are widely used and generally includes two display panels where field generating electrodes such as a pixel electrode and a common electrode are formed, and a liquid crystal layer interposed therebetween.

The LCD generates an electric field in a liquid crystal layer by applying a voltage to the field generating electrodes, to determine orientations of liquid crystal molecules of the liquid crystal layer and control polarization of incident light, thereby displaying an image.

The LCD also includes a switching element connected to each pixel electrode, and a plurality of signal lines including gate lines and data lines for applying the voltage to the pixel electrode by controlling the switching element.

Among the LCDs, a vertically aligned mode LCD in which a long axis of the liquid crystal molecules are arranged to be perpendicular to a display panel in the state in which an electric field is not applied has been in the limelight due to a high contrast ratio and a wide reference viewing angle thereof. A wide reference viewing angle is defined as a viewing angle that makes the contrast ratio equal to 1:10 or as a limit angle for inversion in luminance between grays.

In order to approximate side visibility to front visibility in the vertical alignment ("VA") mode LCD, a method of causing a difference in transmittance by dividing one pixel into two sub-pixels and applying different voltages to the two sub-pixels has been suggested.

SUMMARY

When dividing one pixel into two subpixels and approximating the side visibility to the front visibility by differentiating the transmittance, the transmittance is decreased by an interval between the two subpixels.

The invention provides a liquid crystal display ("LCD") effectively preventing transmittance deterioration while approximating side visibility to front visibility.

An LCD according to an exemplary embodiment of the invention includes a first substrate, a pixel electrode disposed on the first substrate and including a first subpixel electrode and a second subpixel electrode separated from each other and disposed at one pixel area, a second substrate facing the first substrate, a common electrode disposed on the second substrate, and a liquid crystal layer disposed between the first substrate and the second substrate, where a first voltage applied to the first subpixel electrode is larger than a second voltage applied to the second subpixel electrode, the first subpixel electrode includes a plurality of first branch electrodes, the second subpixel electrode includes a plurality of second branch electrodes, and the second subpixel electrode is disposed at an outer edge of the pixel area to enclose the first subpixel electrode.

In an exemplary embodiment, a separation interval between the first subpixel electrode and the second subpixel electrode may be about 1 micrometer (μm) to about 5 μm.

In an exemplary embodiment, the separation interval between the first subpixel electrode and the second subpixel electrode may be about 3.0 μm, and a ratio of the second voltage to the first voltage may be less than about 0.9.

In an exemplary embodiment, the separation interval between the first subpixel electrode and the second subpixel electrode may be about 4.0 μm, and a ratio of the second voltage for the first voltage may be less than about 0.8.

In an exemplary embodiment, the separation interval between the first subpixel electrode and the second subpixel electrode may be about 5.0 μm, and a ratio of the second voltage to the first voltage may be less than about 0.7.

In an exemplary embodiment, an overall shape of the first subpixel electrode may be a polygon shape such as a hexagon, and an overall shape of the second subpixel electrode may be a shape of which four trapezoids are gathered.

In an exemplary embodiment, the first subpixel electrode may further include a crossed-shape stem including a transverse stem and a longitudinal stem, and the plurality of first branch electrodes may extend from the crossed-shape stem in four different directions.

In an exemplary embodiment, the second subpixel electrode may further include an outer stem disposed at an outer edge of the pixel area, and the plurality of second branch electrodes may extend from the outer stem in four different directions.

In an exemplary embodiment, the second subpixel electrode may further includes a plurality of first connections disposed at the outer edge of the pixel area and connecting two adjacent second branch electrodes among the plurality of second branch electrodes.

In an exemplary embodiment, the second subpixel electrode may further include a plurality of second connections disposed at an edge of the second subpixel electrode adjacent to the first subpixel electrode and connecting two adjacent second branch electrodes among the plurality of second branch electrodes, and a plurality of first connections and a plurality of second connections may be alternately disposed one by one.

In an exemplary embodiment, the first subpixel electrode may further include a plurality of third connections disposed at an edge of the first subpixel electrode adjacent to the second subpixel electrode and connecting two adjacent second branch electrodes among the plurality of first branch electrodes, and the plurality of second connections and the plurality of third connections may be disposed to be adjacent.

In an exemplary embodiment, the second subpixel electrode may include an outer stem disposed at the outer edge of the pixel area and a first stem disposed at the edge of the second subpixel electrode adjacent to the first subpixel electrode, and the plurality of second branch electrodes may extend from the outer stem and the first stem in the four different directions.

In an exemplary embodiment, the first subpixel electrode may further include a second stem disposed at the edge of the first subpixel electrode adjacent to the second subpixel electrode, and the plurality of first branch electrodes may extend from the crossed-shape stem and the second stem in the four different directions.

The LCD according to an exemplary embodiment of the invention may effectively prevent transmittance deterioration while approximating the side visibility to the front visibility.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
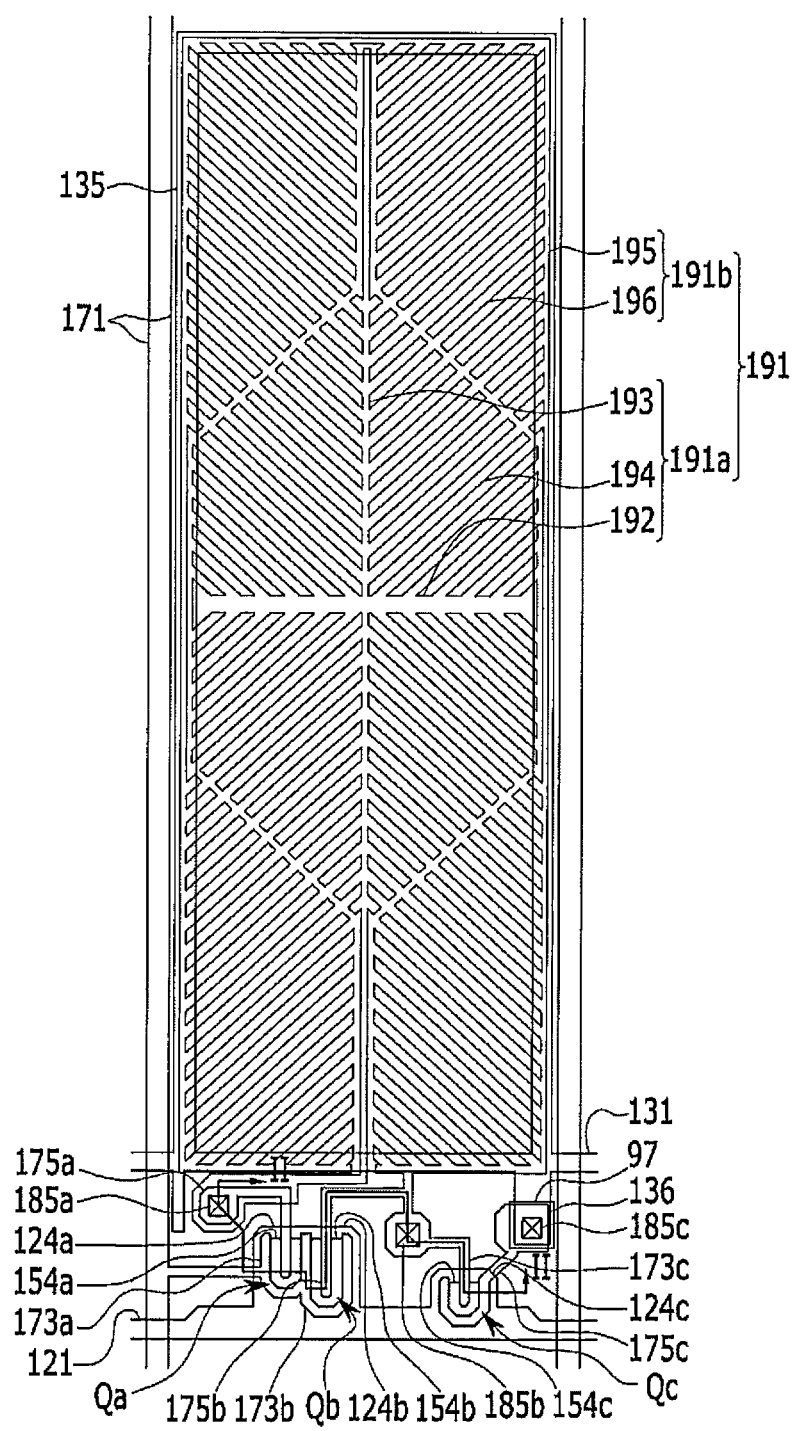
FIG. 1 is a plan view of an exemplary embodiment of a liquid crystal display ("LCD") according to the invention.

Preferred exemplary embodiments of the invention will be described in detail with reference to the accompanying drawings. However, the invention is not limited to the exemplary embodiments that are described herein, and may be embodied into other forms. The exemplary embodiments that are disclosed herein are provided so that the disclosed contents may become thorough and complete and the spirit of the invention may be sufficiently understood by a person of ordinary skill in the art.

In the drawings, the thickness of layers and regions are exaggerated for clarity. In addition, in the case when it is mentioned that a layer is "on" the other layer or a substrate, the layer may be directly disposed on the other layer or the substrate or a third layer may be interposed therebetween. Like reference numerals designate like constituent elements throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a liquid crystal display ("LCD") according to an exemplary embodiment of the invention will be described with reference to FIGS. 1 and 2. FIG. 1 is a plan view of an LCD according to an exemplary embodiment of the invention, and FIG. 2 is a cross-sectional view of the LCD of FIG. 1 taken along line II-II.

Figure 2:
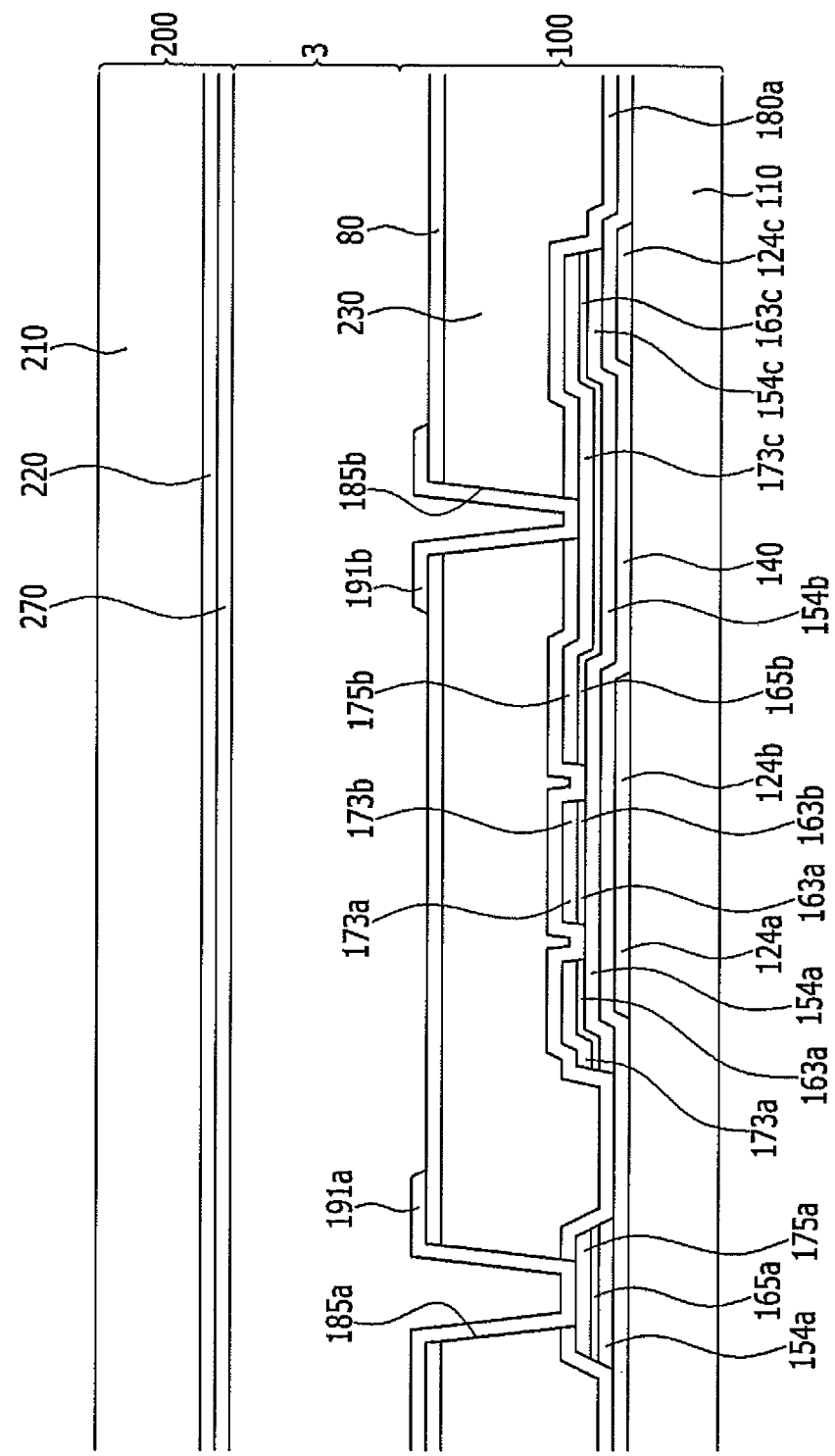
FIG. 2 is a cross-sectional view of the LCD of FIG. 1 taken along line II-II.

Referring to FIGS. 1 and 2, an LCD according to the exemplary embodiment includes a lower panel 100 and an upper panel 200 facing each other, and a liquid crystal layer 3 interposed between the two display panels 100 and 200.

Firstly, the lower panel 100 will be described.

A gate line 121, a reference voltage line 131, and a storage electrode 135 are disposed on a first substrate 110 including transparent glass or plastic. The gate line 121 transfers a gate signal and mainly extends in a transverse direction.

The gate line 121 includes a first gate electrode 124a, a second gate electrode 124b, a third gate electrode 124c, and a wide end (not shown) for connection with other layers or an external driving circuit.

The reference voltage line 131 may extend in parallel to the gate line 121 and includes an expansion 136, and the expansion 136 is connected to a third drain electrode 175c that will be described later.

The reference voltage line 131 includes the storage electrode 135 enclosing a pixel area.

A gate insulating layer 140 is disposed on the gate line 121, the reference voltage line 131, and the storage electrode 135.

A first semiconductor 154a, a second semiconductor 154b, and a third semiconductor 154c that may include amorphous silicon or crystalline silicon are disposed on the gate insulating layer 140.

A plurality of ohmic contacts 163a, 163b, 163c, 165a, and 165b is disposed on the first semiconductor 154a, the second semiconductor 154b, and the third semiconductor 154c.

When the semiconductors 154a, 154b, and 154c are provided with an oxide semiconductor, the ohmic contacts may be omitted.

Data conductors 171, 173a, 173b, 173c, 175a, 175b, and 175c including a data line 171 including a first source electrode 173a and a second source electrode 173b, a first drain electrode 175a, a second drain electrode 175b, a third source electrode 173c, and a third drain electrode 175c are disposed on the ohmic contacts 163a, 163b, 163c, 165a, and 165b and the gate insulating layer 140.

The second drain electrode 175b is connected to the third source electrode 173c.

The first gate electrode 124a, the first source electrode 173a, and the first drain electrode 175a provide a first thin film transistor ("TFT") Qa along with the first semiconductor 154a, and a channel of the TFT is provided in the semiconductor 154a between the first source electrode 173a and the first drain electrode 175a. Similarly, the second gate electrode 124b, the second source electrode 173b, and the second drain electrode 175b provide a second TFT Qb along with the second semiconductor 154b, and a channel of the TFT is provided in the semiconductor 154b between the second source electrode 173b and the second drain electrode 175b, and the third gate electrode 124c, the third source electrode 173c, and the third drain electrode 175c provide a third TFT Qc along with the third semiconductor Qc, and a channel of the TFT is provided in the semiconductor 154c between the third source electrode 173c and the third drain electrode 175c.

In an exemplary embodiment, a first passivation layer 180a that may include an inorganic insulator such as silicon nitride or silicon oxide is disposed on the data conductors 171, 173a, 173b, 173c, 175a, 175b, and 175c and exposed portions of the semiconductors 154a, 154b, and 154c.

A color filter 230 is disposed on the first passivation layer 180a.

A light blocking member (not shown) may be disposed on a region where the color filter 230 is not disposed and on a portion of the color filter 230. The light blocking member is referred to as a black matrix and prevents light leakage.

An overcoat (capping layer) 80 is disposed on the color filter 230. The overcoat 80 prevents peeling of the color filter 230 and the light blocking member, and prevents contamination of the liquid crystal layer 3 by an organic material of the solvent that inflows from the color filter 230, so that it prevents defects such as afterimages that may occur when an image is driven.

A pixel electrode 191 including a first subpixel electrode 191a and a second subpixel electrode 191b that are separated from the first subpixel electrode 191a and separated from a connection member 97 are disposed on the overcoat 80.

Referring to FIG. 1, an overall shape of the first subpixel electrode 191a is a polygon shape such as a hexagon, and the first subpixel electrode 191a is enclosed by the second subpixel electrode 191b. An overall shape of the second subpixel electrode 191b is a shape of which four trapezoids are gathered, and is disposed at the edge of the pixel area.

The first subpixel electrode 191a includes a crossed-shape stem (192 and 193) including a transverse stem 192 and a longitudinal stem 193, and a plurality of first branch electrodes 194 extending from the crossed-shape stem (192 and 193). The first branch electrodes 194 extend in four different directions. In detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191b includes an outer stem 195 enclosing the edge of the pixel area, and a plurality of second branch electrodes 196 extending from the outer stem 195. The second branch electrodes 196 extend in four different directions. In detail, the second branch electrodes 196 include a plurality of fifth minute branches obliquely extending in the left-upper direction from the outer stem 195, a plurality of sixth minute branches obliquely extending in the right-upper direction, a plurality of seventh minute branches obliquely extending in the left-lower direction, and a plurality of eighth minute branches obliquely extending in the right-lower direction.

An interval between an end of the first subpixel electrode 191a and an end of the second subpixel electrode 191b adjacent to each other, that is, a separation interval between the first subpixel electrode 191a and the second subpixel electrode 191b, may be about 1 micrometers (μm) to about 5 μm.

A first contact hole 185a exposing a portion of the first drain electrode 175a, a second contact hole 185b exposing a portion of the second drain electrode 175b and a third contact hole 185c exposing a portion of the third drain electrode 175c and a portion of the expansion 136 are defined in the first passivation layer 180a and the overcoat 80. The connection member 97 is disposed on the third drain electrode 175c and a portion of the expansion 136 exposed through the third contact hole 185c to connect the third drain electrode 175c and the expansion 136 to each other.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive the data voltage from the first drain electrode 175a and the second drain electrode 175b through the first contact hole 185a and the second contact hole 185b, respectively.

Now, the upper panel 200 will be described.

A light blocking member 220 and a common electrode 270 are disposed on a second substrate 210 including transparent glass or plastic.

However, in the case of the LCD according to another exemplary embodiment of the invention, the light blocking member 220 may be disposed on the lower panel 100, and in the case of the LCD according to another exemplary embodiment of the invention, the color filter 230 may be disposed on the upper panel 200.

Alignment layers (not shown) may be disposed on an inner surface of the display panels 100 and 200, and the alignment layers may include vertical alignment ("VA") layers.

A polarizer (not shown) may be provided on the outer surface of the two display panels 100 and 200, and it is preferable that transmissive axes of the two polarizers may be orthogonal to each other and that either transmissive axis of them is parallel to the gate line 121. However, the polarizer may only be disposed at one outer surface of the two display panels 100 and 200.

In an exemplary embodiment, the liquid crystal layer 3 has negative dielectric anisotropy, and liquid crystal molecules of the liquid crystal layer 3 may be aligned so that long axes thereof are perpendicular with respect to the surface of the two display panels 100 and 200 in a state in which electric field is not generated. Therefore, the incident light does not pass through the crossed polarizers but is blocked in a state in which electric field is not generated.

In an exemplary embodiment, at least one of the liquid crystal layer 3 and the alignment layer may include a photoreactive material, in detail, a reactive mesogen, for example.

Figure 3A:
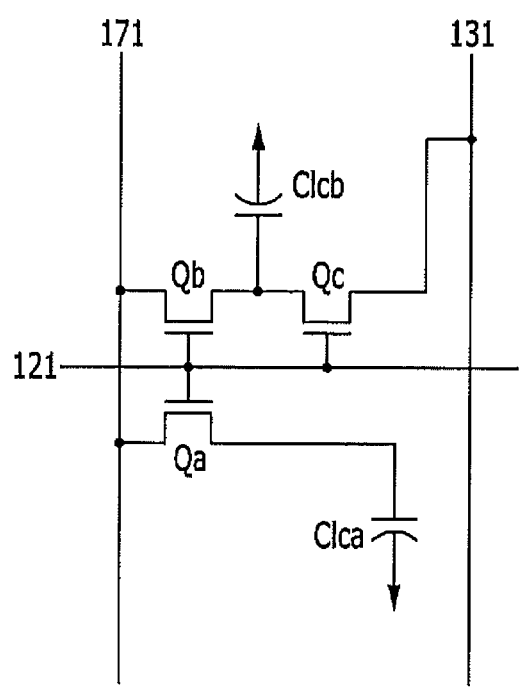
FIG. 3A is an equivalent circuit diagram of an exemplary embodiment of one pixel of an LCD according to the invention.

Next, a driving method of an LCD according to the exemplary embodiment will be described with reference to FIGS. 1 and 3A. FIG. 3A is an equivalent circuit diagram of one pixel of an LCD according to an exemplary embodiment of the invention.

When the gate line 121 is applied with a gate-on signal, the first gate electrode 124a, the second gate electrode 124b, and the third gate electrode 124c are applied with the gate-on signal such that the first switching element Qa, the second switching element Qb, and the third switching element Qc are turned on. Accordingly, the data voltage applied to the data line 171 is applied to the first subpixel electrode 191a and the second subpixel electrode 191b through the turned-on first switching element Qa and second switching element Qb. At this time, the first subpixel electrode 191a and the second subpixel electrode 191b are applied with a voltage of the same magnitude. However, the voltage applied to the second subpixel electrode 191b is divided through the third switching element Qc connected in parallel to the second switching element Qb. Accordingly, the voltage applied to the second subpixel electrode 191b is lower than the voltage applied to the first subpixel electrode 191a.

Accordingly, charge voltages of a first liquid crystal capacitor provided between the first subpixel electrode 191a and the common electrode 270 and a second liquid crystal capacitor provided between the second subpixel electrode 191b and the common electrode 270 represent different gamma curves, and a gamma curve of one pixel voltage becomes a combination curved line thereof. The combination gamma curve at the front is to be identical to a reference gamma curve at the front that is determined to be most appropriate, and the combination gamma curve at the side of the display is to be closest to the reference gamma curve at the front. As described above, the side visibility is improved by converting the image data.

As described above, the separation interval between the first subpixel electrode 191a and the second subpixel electrode 191b may be about 1 μm to about 5 μm.

When the separation interval between the first subpixel electrode 191a and the second subpixel electrode 191b is about 3.0 μm, a ratio of the voltage applied to the second subpixel electrode 191b to the voltage applied to the first subpixel electrode 191a is preferably less than about 0.9. When the separation interval between the first subpixel electrode 191a and the second subpixel electrode 191b is about 4.0 μm, a ratio of the voltage applied to the second subpixel electrode 191b to the voltage applied to the first subpixel electrode 191a is preferably less than about 0.8. Also, when the separation interval between the first subpixel electrode 191a and the second subpixel electrode 191b is about 5.0 μm, a ratio of the voltage applied to the second subpixel electrode 191b to the voltage applied to the first subpixel electrode 191a is preferably less than about 0.7.

In general, according to a conventional LCD, the first subpixel electrode 191a and the second subpixel electrode 191b respectively have an approximate quadrangular shape and are disposed up and down to be separated from each other. Also, in this case, the first subpixel electrode 191a and the second subpixel electrode 191b are respectively provided to have a crossed-shape stem and a plurality of branch electrodes extending from the crossed-shape stem. Therefore, in a region between the first subpixel electrode 191a and the second subpixel electrode 191b and each crossed-shape stem region of the first subpixel electrode 191a and the second subpixel electrode 191b, the transmittance of the LCD is deteriorated.

However, in the case of the LCD according to an exemplary embodiment of the invention, the overall shape of the first subpixel electrode 191a is the polygon such as the hexagon, the first subpixel electrode 191a is enclosed by the second subpixel electrode 191b, and the overall shape of the second subpixel electrode 191b is the shape of which four trapezoids are gathered, and is disposed at the edge of the pixel area.

Also, the first subpixel electrode 191a includes the crossed-shape stem (192 and 193) including the transverse stem 192 and the longitudinal stem 193 and a plurality of first branch electrodes 194 extending from the crossed-shape stem (192 and 193), but the second subpixel electrode 191b includes the outer stem 195 provided along with the outer edge of the pixel area and a plurality of second branch electrodes 196 extending from the outer stem 195. Accordingly, the separation interval between the first subpixel electrode 191a and the second subpixel electrode 191b may be relatively narrow, the stem of the second subpixel electrode 191b is provided at a center of the pixel area, and the second subpixel electrode 191b includes the outer stem 195 provided according to the outer edge of the pixel area, thereby preventing the transmittance deterioration generated near the crossed-shape stem.

Also, a portion of the longitudinal stem 193 of the first subpixel electrode 191a is disposed between the second branch electrodes 196 of the second subpixel electrode 191b. At this time, by the voltage difference between the longitudinal stem 193 of the first subpixel electrode 191a and the second branch electrodes 196 of the second subpixel electrode 191b, an electric field is generated between the portion of the longitudinal stem 193 of the first subpixel electrode 191a and the second branch electrodes 196 of the second subpixel electrode 191b adjacent to each other. Accordingly, the liquid crystal molecules disposed near the portion of the longitudinal stem 193 of the first subpixel electrode 191a are inclined in the direction almost parallel to the direction that the second branch electrodes 196 of the second subpixel electrode 191b extend. Therefore, the transmittance deterioration generated near the portion of the longitudinal stem 193 of the first subpixel electrode 191a may be prevented.

According to the LCD according to an exemplary embodiment of the invention, while dividing one pixel electrode 191 into the first subpixel electrode 191a and the second subpixel electrode 191b that are separated from each other, the transmittance deterioration of the LCD may be prevented.

Also, according to the LCD according to an exemplary embodiment of the invention, the second subpixel electrode 191b applied with the relatively low voltage encloses the first subpixel electrode 191a applied with the relatively high voltage and the second subpixel electrode 191b is disposed at the outer edge of the pixel area, thereby reducing unnecessary parasitic capacitance that may be generated by overlapping of the data line 171 and the pixel electrode 191. In detail, since the parasitic capacitance is proportional to the voltage magnitude of two overlapping electrodes, the parasitic capacitance generated when the first subpixel electrode 191a applied with the relatively high voltage and the data line 171 overlap each other is smaller than the parasitic capacitance generated when the second subpixel electrode 191b applied with the relatively low voltage and the data line 171 overlap each other. Therefore, according to the LCD according to an exemplary embodiment of the invention, since the data line 171 mainly overlaps the second subpixel electrode 191b disposed at the outer edge of the pixel area, compared with the case that the first subpixel electrode 191a and the second subpixel electrode 191b overlap the data line 171 with the same area, the unnecessary parasitic capacitance that may be generated by the overlapping of the data line 171 and the pixel electrode 191 may be reduced. Since the unnecessary parasitic capacitance may be reduced, the size of the second subpixel electrode 191b may be relatively increased, and as a result, the transmittance of the LCD may be increased.

As described with reference to FIG. 3A, according to the LCD according to the exemplary embodiment, to differentiate the voltage charged to the first liquid crystal capacitor Clca connected to the first subpixel electrode 191a and the voltage charged to the second liquid crystal capacitor Clcb connected to the second subpixel electrode 191b, the output terminal of the second switching element Qb connected to the second subpixel electrode 191b providing the second liquid crystal capacitor Clcb and the third switching element Qc connected to the divided voltage reference voltage line 131 are included. However, in a case of the LCD according to another exemplary embodiment of the invention, the output terminal of the second switching element Qb connected to the second subpixel electrode 191b providing the second liquid crystal capacitor Clcb and the third switching element Qc connected to a step-down capacitor may be included. This will be described with reference to FIG. 3B.

Figure 3B:
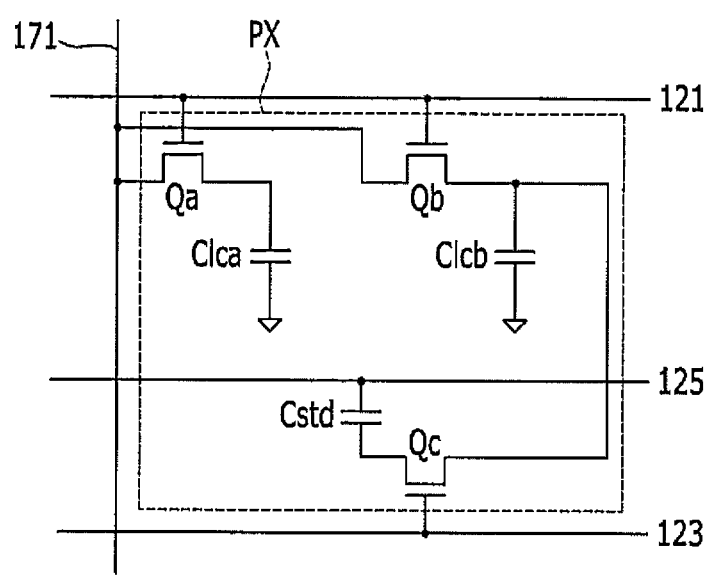
FIG. 3B is an equivalent circuit diagram of another exemplary embodiment of one pixel of an LCD according to the invention.

Referring to FIG. 3B, the LCD according to the illustrated exemplary embodiment of the invention may include the output terminal of the second switching element Qb connected to the second subpixel electrode 191b providing the second liquid crystal capacitor Clcb and the third switching element Qc connected to the step-down capacitor Cstd. In this case, the third switching element Qc may be connected to a step-down gate line 123 different from the first switching element Qa and the second switching element Qb, and after the gate line 121 is applied with the gate-on signal such that the first switching element Qa and the second switching element Qb are turned on then turned off, the step-down gate line 123 is applied with the gate-on signal such that the third switching element Qc may be turned on. After the first switching element Qa and the second switching element Qb are turned on then turned off, when the third switching element Qc is turned on, the charge is moved from the second subpixel electrode 191b to the step-down capacitor Cstd through the third switching element Qc. Thus, the charged voltage of the second liquid crystal capacitor Clcb is decreased and the step-down capacitor Cstd is charged. The charged voltage of the second liquid crystal capacitor Clcb is decreased by the capacitance of the step-down capacitor Cstd such that the charge voltage of the second liquid crystal capacitor Clcb is lower than the charge voltage of the first liquid crystal capacitor Clca. At this time, the difference of the charge voltage may be controlled by the magnitude of the voltage applied to a second reference voltage line 125 connected to the other terminal of the step-down capacitor Cstd.

Figure 3C:
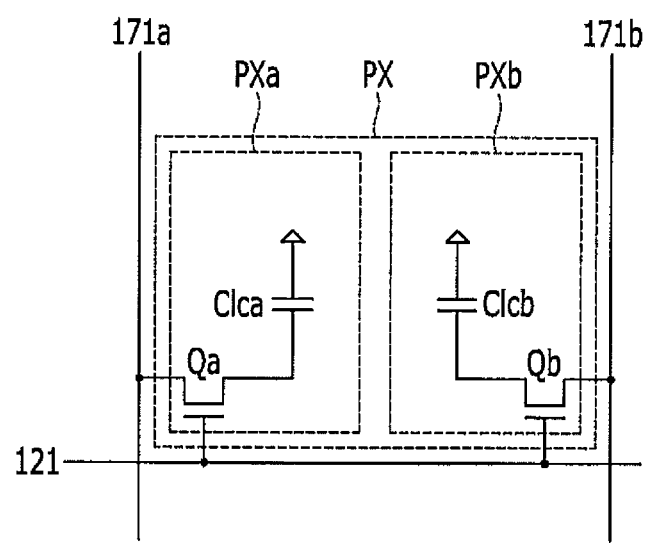
FIG. 3C is an equivalent circuit diagram of an exemplary embodiment of one pixel of an LCD according to the invention.

Also, as shown in FIG. 3C, in a case of the LCD according to another exemplary embodiment of the invention, the first liquid crystal capacitor Clca in a first pixel area PXa of a pixel PX and the second liquid crystal capacitor Clcb in a second pixel area PXb of the pixel PX are respectively connected to a different first data line 171a and second data line 171b to be applied with different data voltages, thereby differentiating the charge voltages of the first liquid crystal capacitor and the second liquid crystal capacitor.

The charge voltage of the first liquid crystal capacitor Clca and the second liquid crystal capacitor Clcb may be differentiated by various methods.

Figure 4A:
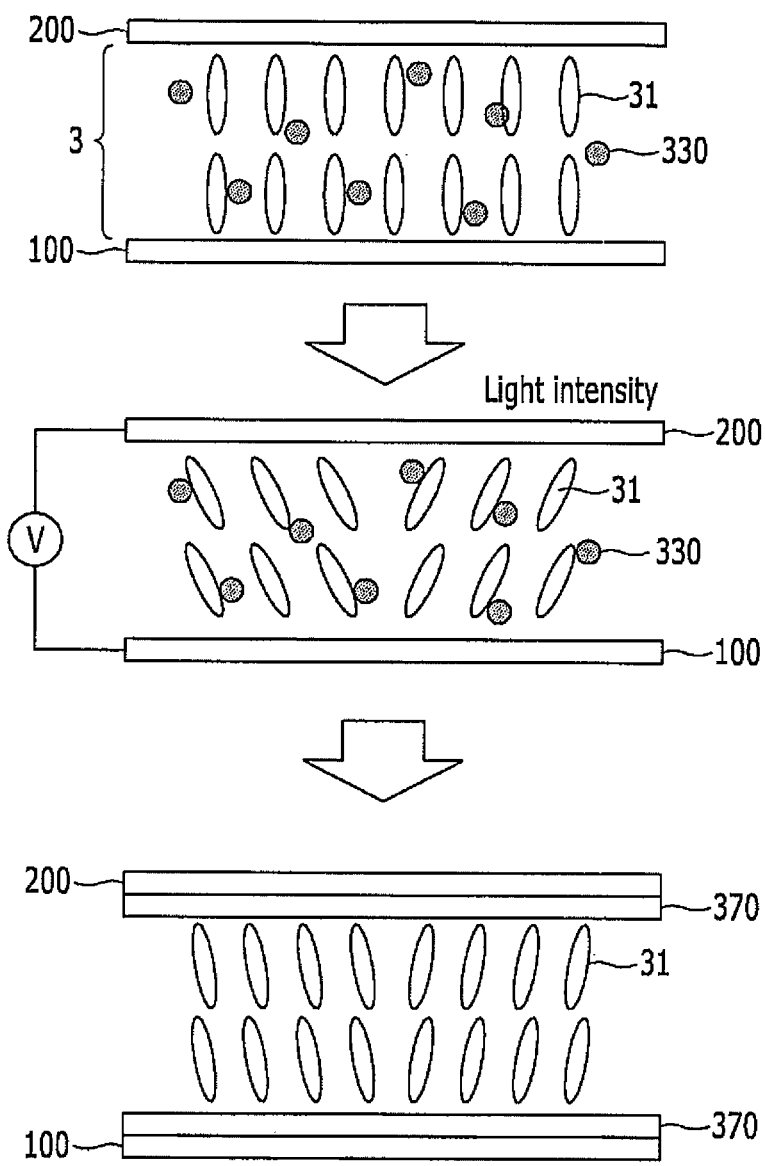
FIG. 4A is a view showing a process for providing a pretilt to liquid crystal molecules by using prepolymers that are polymerized by light such as ultraviolet ("UV") rays.

As described above, at least one of the liquid crystal layer 3 and the alignment layer may include a photoreactive material, and in detail, a reactive mesogen. Next, an initial alignment method of providing the pretilt to the liquid crystal molecules of the liquid crystal layer will be described with reference to FIG. 4A. FIG. 4A is a view showing a process for providing a pretilt to liquid crystal molecules 31 by using prepolymers that are polymerized by light such as ultraviolet ("UV") rays.

Firstly, prepolymers 330 such as a monomer, which is hardened through polymerization by light such as UV rays, are inserted between the two display panels 100 and 200 along with the liquid crystal material. The prepolymers 330 may be a reactive mesogen that is polymerized by light such as UV rays.

Next, through several methods, the first subpixel electrode 191a and the second subpixel electrode 191b are applied with voltages of different magnitudes and the common electrode 270 of the upper panel 200 is applied with the common voltage to generate the electric field to the liquid crystal layer 3 between the two display panels 100 and 200. Thus, in response to the electric field, the liquid crystal molecules 31 of the liquid crystal layer 3 are respectively inclined in four directions as the direction parallel to the extending direction of the first branch electrodes 194 of the first subpixel electrode 191a by the fringe field due to the plurality of first branch electrodes 194 of the first subpixel electrode 191a and the common electrode 270, and in four directions as the direction parallel to the extending direction of the second branch electrodes 196 of the second subpixel electrode 191b by the fringe field due to a plurality of second branch electrodes 196 of the second subpixel electrode 191b and the common electrode 270. At this time, since the first subpixel electrode 191a and the second subpixel electrode 191b are applied with the voltages of the different magnitudes, the inclination angles of the liquid crystal molecules 31 corresponding to the first subpixel electrode 191a and the liquid crystal molecules 31 corresponding to the second subpixel electrode 191b are different with reference to the first substrate 110.

After generating the electric field to the liquid crystal layer 3, when the light such as UV rays is irradiated, the prepolymers 330 are polymerized to provide a polymer 370. The polymer 370 is provided while contacting the display panels 100 and 200. The alignment direction is determined for the liquid crystal molecules 31 to have the pretilt in the length direction of the minute branches by the polymer 370. Accordingly, the liquid crystal molecules 310 are arranged with the pretilts of four different directions under non-application of the voltage to the electrodes 191 and 270.

Figure 4B:
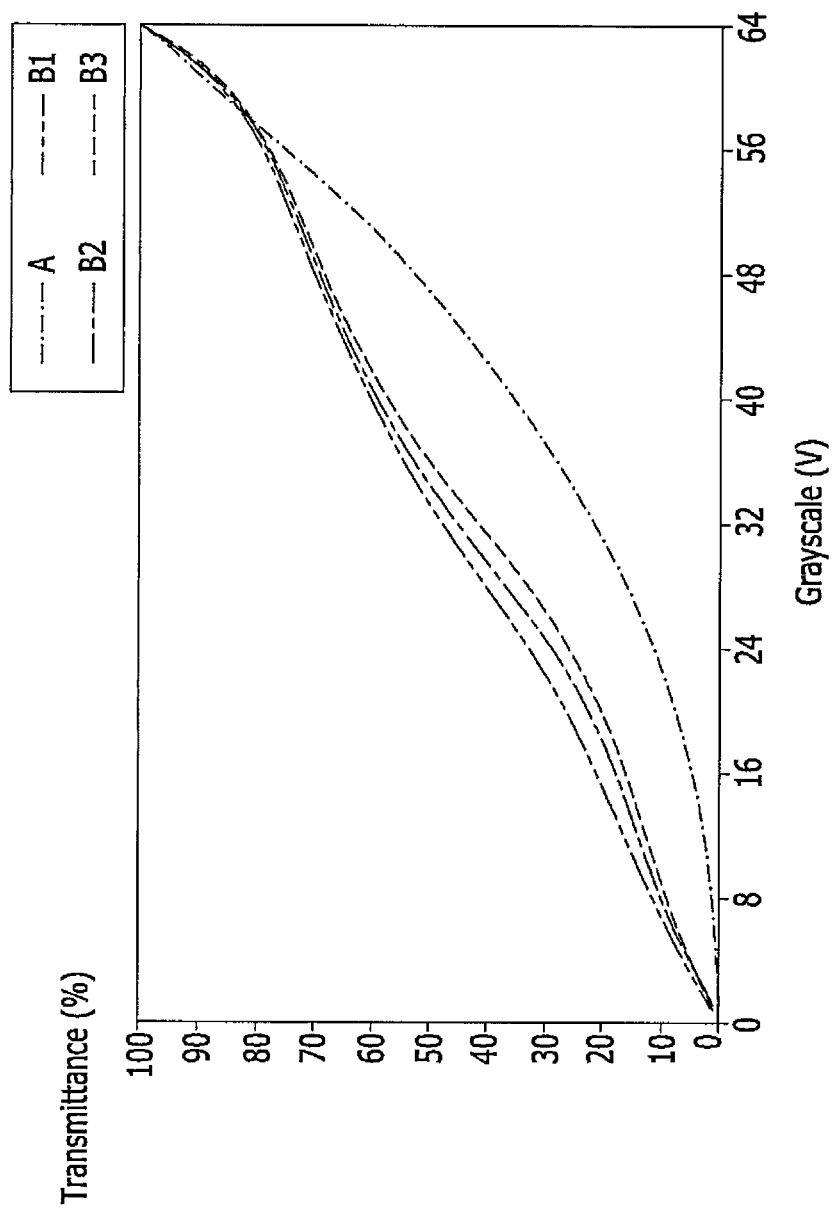
FIG. 4B is a graph showing an experimental example of a transmittance change of an LCD according to the invention.

Next, an effect for differently setting the charge voltages between the first liquid crystal capacitor Clca and the second liquid crystal capacitor Clcb according to one experimental example of the invention will be described with reference to FIG. 4B. FIG. 4B is a graph showing a transmittance change in terms of percentage (%) depending on a grayscale in terms of voltage (V) of an LCD according to an experimental example of the invention.

In the experimental example, an area ratio of the first subpixel electrode 191a and the second subpixel electrode 191b is about 1:1.5, and in the method of initially aligning the liquid crystal molecules 31 to have the pretilt, while controlling the voltages applied to the first subpixel electrode 191a and the second subpixel electrode 191b, the transmittance for each gray at the side of the LCD is measured and is compared with the transmittance for each gray at the front of the LCD. In the experimental example, in the method of initially aligning the liquid crystal molecules 31 to have the pretilt, a first case B1 in which the voltage of the first subpixel electrode 191a and the voltage of the second subpixel electrode 191b are almost the same at about 9.5 volts (V), a second case B2 in which the voltage of the first subpixel electrode 191a is about 14.5 V and the voltage of the second subpixel electrode 191b is about 9.5 V, and a third case B3 in which the voltage of the first subpixel electrode 191a is about 12 V and the voltage of the second subpixel electrode 191b is about 9.5 V, a result therefor is shown in FIG. 4B. In FIG. 4B, A represents the transmittance result for each gray in the front of the LCD.

Referring to FIG. 4B, in the first case B1 in which the voltage difference is very small between the first subpixel electrode 191a and the second subpixel electrode 191b on the initial alignment, the difference of the transmittance for each gray is large in the front, but in the second and third cases B2 and B3 in which the voltage difference exists between the first subpixel electrode 191a and the second subpixel electrode 191b on the initial alignment compared with the first case B1, the difference between the transmittance for each gray at the front of the LCD and the transmittance for each gray at the side is decreased. Particularly, the low gray, for example, in the region of grays from about 8 to 40, compared with the first case B1, in the second case B2 and the third case B3, the difference between the transmittance for each gray at the front of the LCD and the transmittance for each gray at the side is largely reduced.

Figure 5:
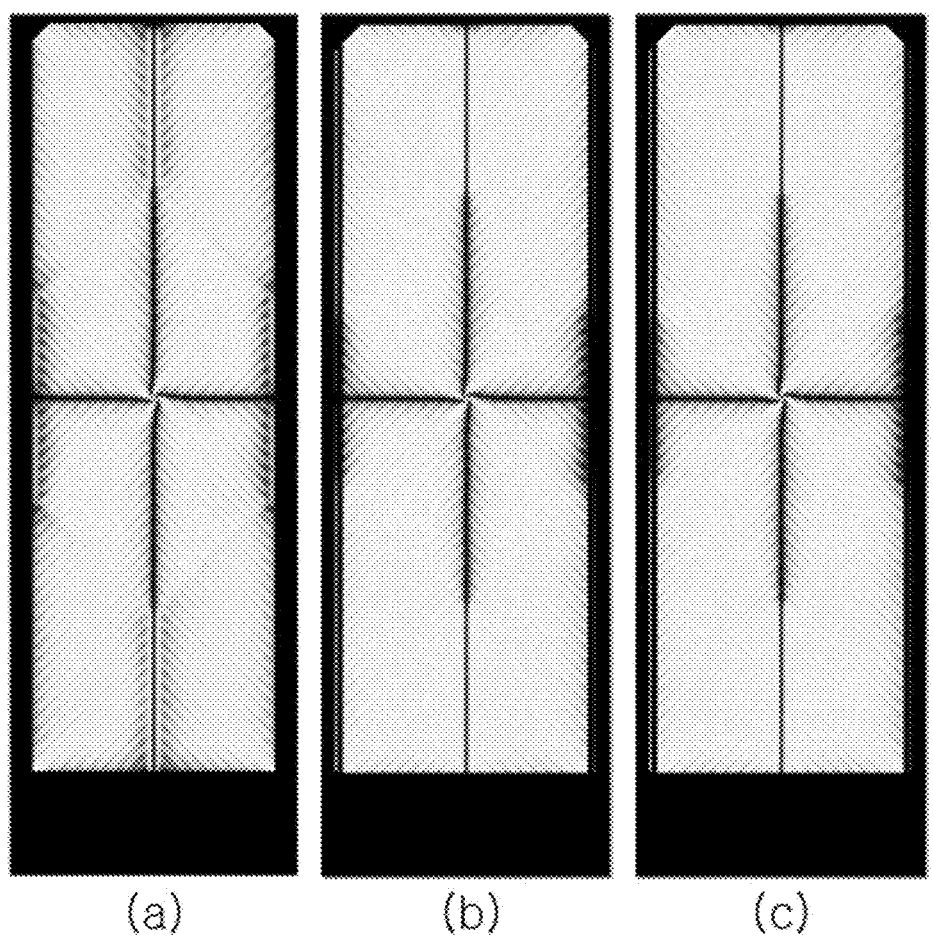
FIGS. 5 to 7 are electron microscope photographs showing an experimental example of a transmittance change of an LCD according to the invention.
Figure 6:
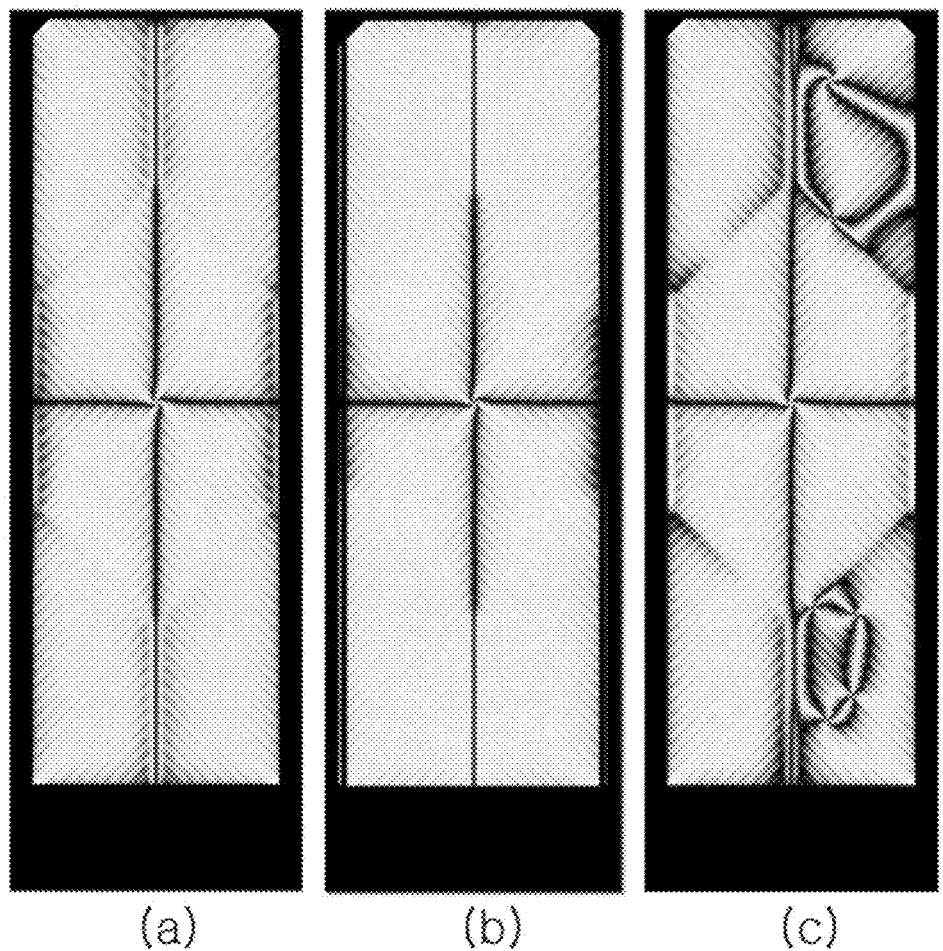
Figure 7:
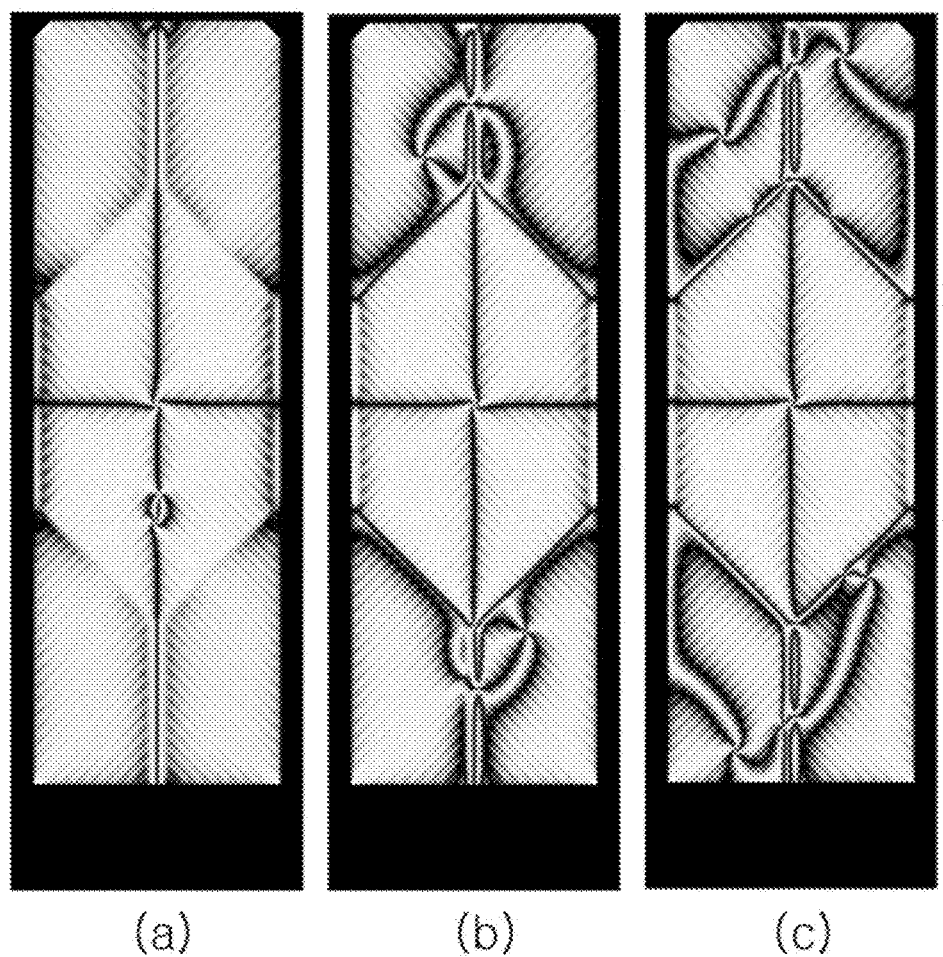

Next, a result of an experimental example of the invention will be described with reference to FIGS. 5 to 7. FIGS. 5 to 7 are electron microscope photographs showing a transmittance change of an LCD according to an experimental example of the invention.

In the experimental example, referring to the exemplary embodiment shown in FIG. 1, when the first subpixel electrode 191a and the second subpixel electrode 191b are provided, the separation distance between the first subpixel electrode 191a and the second subpixel electrode 191b is about 3.0 μm, and a ratio of the voltage of the second subpixel electrode 191b to the voltage of the first subpixel electrode 191a is respectively set as about 0.7, about 0.8, and about 0.9, a transmittance result of the LCD is shown in FIG. 5. In FIG. 5, (a) is a case that the ratio of the voltage of the second subpixel electrode 191b to the voltage of the first subpixel electrode 191a is about 0.7, (b) is a case that the ratio of the voltage of the second subpixel electrode 191b to the voltage of the first subpixel electrode 191a is about 0.8, and (c) is a case that the ratio of the voltage of the second subpixel electrode 191b to the voltage of the first subpixel electrode 191a is about 0.9.

In the experimental example, referring to the exemplary embodiment shown in FIG. 1, when the first subpixel electrode 191a and the second subpixel electrode 191b are provided, the separation distance between the first subpixel electrode 191a and the second subpixel electrode 191b is about 4.0 μm, and a ratio of the voltage of the second subpixel electrode 191b to the voltage of the first subpixel electrode 191a is respectively set as about 0.7, about 0.8, and about 0.9, a transmittance result of the LCD is shown in FIG. 6. In FIG. 6, (a) is a case that the ratio of the voltage of the second subpixel electrode 191b to the voltage of the first subpixel electrode 191a is about 0.7, (b) is a case that the ratio of the voltage of the second subpixel electrode 191b to the voltage of the first subpixel electrode 191a is about 0.8, and (c) is a case that the ratio of the voltage of the second subpixel electrode 191b to the voltage of the first subpixel electrode 191a is about 0.9.

In the experimental example, referring to the exemplary embodiment shown in FIG. 1, when the first subpixel electrode 191a and the second subpixel electrode 191b are provided, the separation distance between the first subpixel electrode 191a and the second subpixel electrode 191b is about 5.0 µm, and a ratio of the voltage of the second subpixel electrode 191b to the voltage of the first subpixel electrode 191a is respectively set as about 0.7, about 0.8, and about 0.9, a transmittance result of the LCD is shown in FIG. 7. In FIG. 7, (a) is a case that the ratio of the voltage of the second subpixel electrode 191b to the voltage of the first subpixel electrode 191a is about 0.7, (b) is a case that the ratio of the voltage of the second subpixel electrode 191b to the voltage of the first subpixel electrode 191a is about 0.8, and (c) is a case that the ratio of the voltage of the second subpixel electrode 191b to the voltage of the first subpixel electrode 191a is about 0.9.

Referring to FIG. 5, like the LCD according to an exemplary embodiment of the invention, in the case that the separation distance between the first subpixel electrode 191a and the second subpixel electrode 191b is about 3.0 µm, when the ratio of the voltage of the second subpixel electrode 191b to the voltage of the first subpixel electrode 191a is less than about 0.9, it is confirmed that the transmittance is not deteriorated on the whole pixel area of the LCD.

Referring to FIG. 6, like the LCD according to an exemplary embodiment of the invention, in the case that the separation distance between the first subpixel electrode 191a and the second subpixel electrode 191b is about 4.0 µm, when the ratio of the voltage of the second subpixel electrode 191b to the voltage of the first subpixel electrode 191a is less than about 0.8, it is confirmed that the transmittance is not deteriorated on the whole pixel area of the LCD, and when the ratio of the voltage of the second subpixel electrode 191b to the voltage of the first subpixel electrode 191a is larger than about 0.8, it is confirmed that irregular movement of the liquid crystal molecules is generated in the region of the second subpixel electrode 191b such that the region where the transmittance is deteriorated is generated.

Referring to FIG. 7, like the LCD according to an exemplary embodiment of the invention, in the case that the separation distance between the first subpixel electrode 191a and the second subpixel electrode 191b is about 5.0 µm, when the ratio of the voltage of the second subpixel electrode 191b to the voltage of the first subpixel electrode 191a is less than about 0.7, it is confirmed that the transmittance is not deteriorated on the whole pixel area of the LCD, and when the ratio of the voltage of the second subpixel electrode 191b to the voltage of the first subpixel electrode 191a is larger than about 0.7, it is confirmed that an irregular movement of the liquid crystal molecule is generated in the region like the domain boundary of the second subpixel electrode 191b such that the region where the transmittance is deteriorated is generated.

Figure 8:
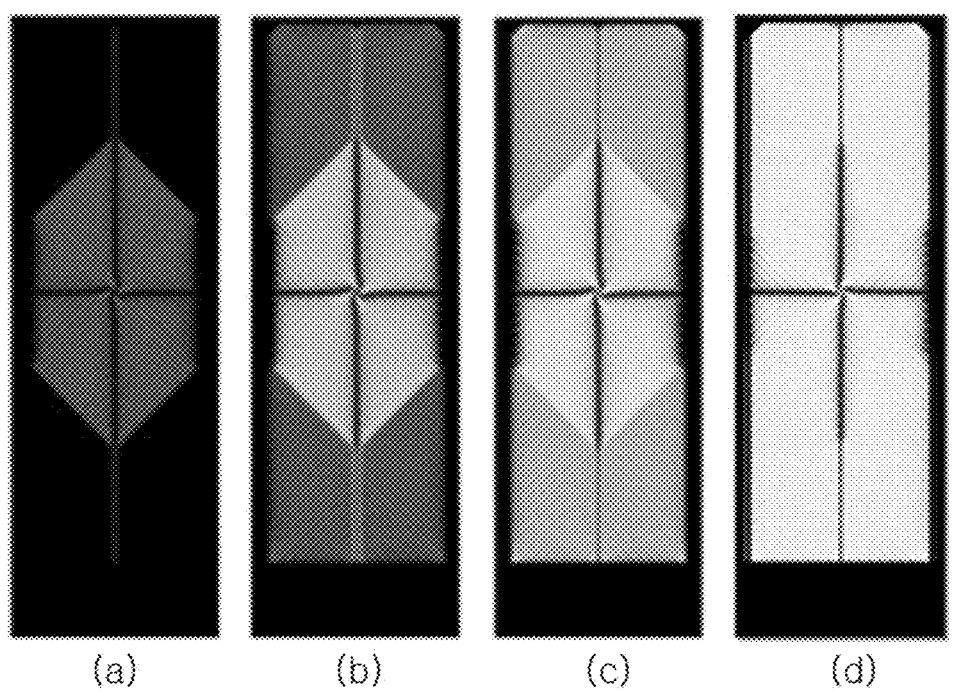
FIG. 8 is an electron microscope photograph showing an experimental example of a transmittance change of an LCD according to the invention.

Next, another experimental example of the invention will be described with reference to FIG. 8. FIG. 8 is an electron microscope photograph showing a transmittance change of an LCD according to an experimental example of the invention.

In the experimental example, like the exemplary embodiment of the LCD shown in FIG. 1, after the first subpixel electrode 191a and the second subpixel electrode 191b are provided and the voltages applied to the first subpixel electrode 191a and the second subpixel electrode 191b are provided to have the different magnitudes on the initial alignment, the transmittance change of one pixel is measured while changing the gray of the LCD. In FIG. 8, (a) represents the transmittance result of a 32 gray, (b) represents the transmittance result of a 96 gray, (c) represents the transmittance result of a 128 gray, and (d) represents the transmittance result of a 256 gray.

Referring to FIG. 8, according to the LCD according to an exemplary embodiment of the invention, it may be confirmed that the transmittance deterioration is not generated in the boundary region between the first subpixel electrode 191a and the second subpixel electrode 191b, and the transmittance deterioration is small near the portion of the longitudinal stem 193 among the crossed-shape stem (192 and 193) of the first subpixel electrode 191a.

Figure 9:
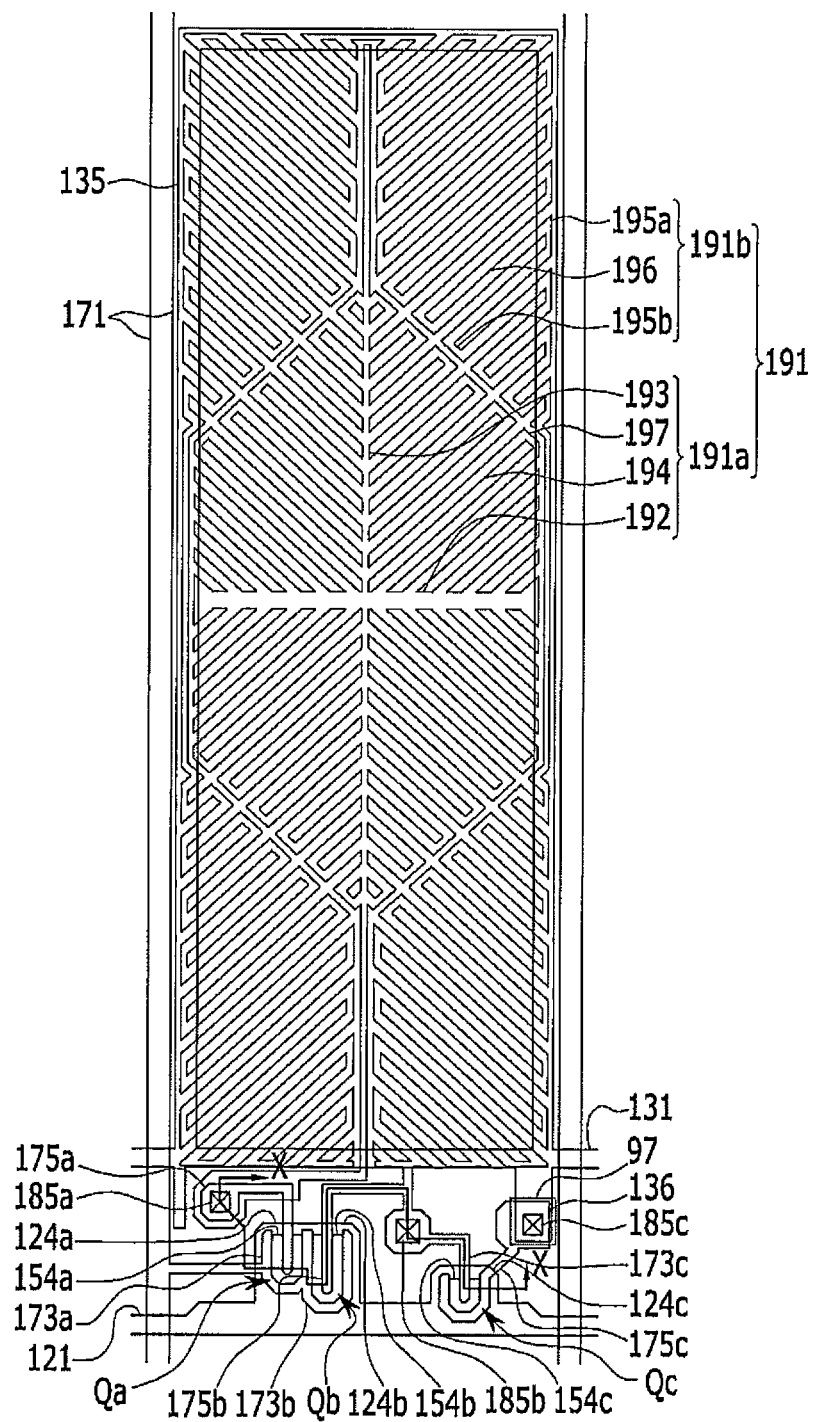
FIG. 9 is a plan view of another exemplary embodiment of an LCD according to the invention.

Next, an LCD according to another exemplary embodiment of the invention will be described with reference to FIGS. 9 to 11. FIG. 9 is a plan view of an LCD according to another exemplary embodiment of the invention, FIG. 10 is a cross-sectional view of the LCD of FIG. 9 taken along line X-X, and FIG. 11 is a plan view of a pixel electrode of the LCD of FIG. 9.

The LCD according to the exemplary embodiment is similar to the LCD according to the exemplary embodiment described with reference to FIGS. 1 and 2.

Figure 10:
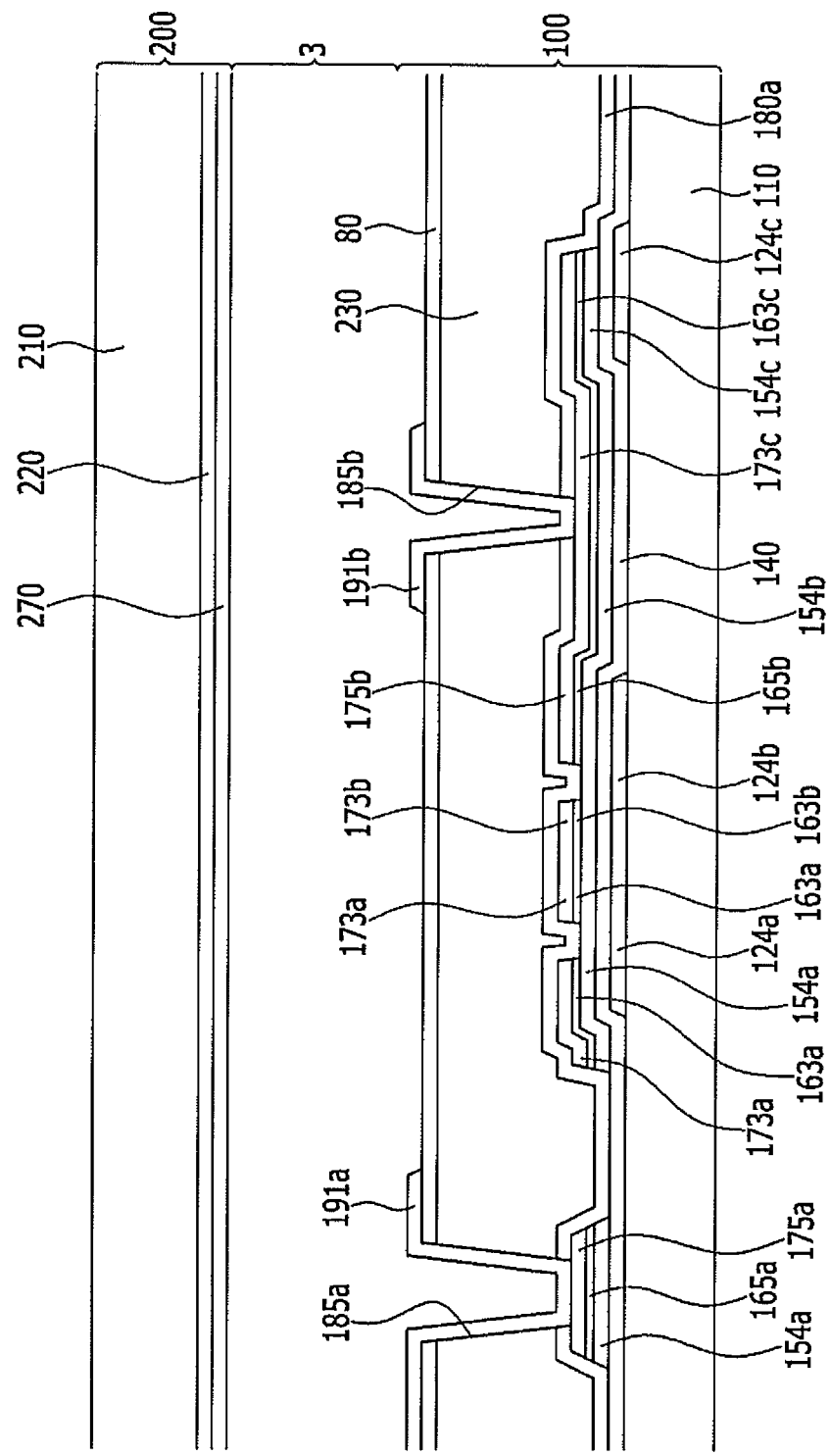
FIG. 10 is a cross-sectional view of the LCD of FIG. 9 taken along line X-X.
Figure 11:
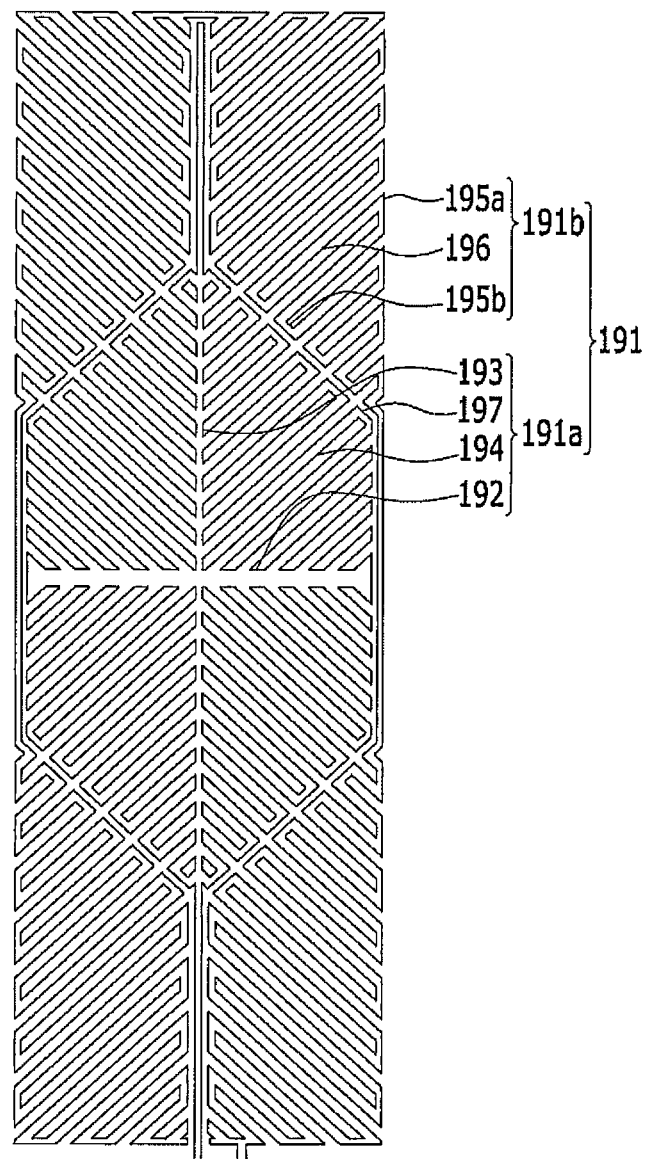
FIG. 11 is a plan view of a pixel electrode of the LCD of FIG. 9.

Referring to FIGS. 9 to 11, the LCD according to the exemplary embodiment includes a lower panel 100 and an upper panel 200 facing each other, and a liquid crystal layer 3 interposed between the two display panels 100 and 200.

Firstly, the lower panel 100 will be described.

A gate line 121, a reference voltage line 131, and a storage electrode 135 are disposed on a first substrate 110. The gate line 121 includes a first gate electrode 124a, a second gate electrode 124b, a third gate electrode 124c, and a wide end (not shown) for connection with other layers or an external driving circuit, and the reference voltage line 131 includes an expansion 136 and a storage electrode 135.

A gate insulating layer 140 is disposed on the gate line 121, the reference voltage line 131, and the storage electrode 135.

A first semiconductor 154a, a second semiconductor 154b, and a third semiconductor 154c are disposed on the gate insulating layer 140.

A plurality of ohmic contacts 163a, 163b, 163c, 165a, and 165b is disposed on the first semiconductor 154a, the second semiconductor 154b, and the third semiconductor 154c.

Data conductors 171, 173a, 173b 173c, 175a, 175b, and 175c including a data line 171 including a first source electrode 173a and a second source electrode 173b, a first drain electrode 175a, a second drain electrode 175b, a third source electrode 173c, and a third drain electrode 175c are disposed on the ohmic contacts 163a, 163b, 163c, 165a, and 165b and the gate insulating layer 140. The second drain electrode 175b is connected to the third source electrode 173c.

The first gate electrode 124a, the first source electrode 173a, and the first drain electrode 175a provide a first TFT Qa along with the first semiconductor 154a, and a channel of the TFT is provided in the semiconductor 154a between the first source electrode 173a and the first drain electrode 175a. Similarly, the second gate electrode 124b, the second source electrode 173b, and the second drain electrode 175b provide a second TFT Qb along with the second semiconductor 154b, and a channel of the TFT is provided in the semiconductor 154b between the second source electrode 173b and the second drain electrode 175b, and the third gate electrode 124c, the third source electrode 173c, and the third drain electrode 175c provide a third TFT Qc along with the third semiconductor Qc, and a channel of the TFT is provided in the semiconductor 154c between the third source electrode 173c and the third drain electrode 175c.

A first passivation layer 180a is disposed on the data conductors 171, 173a, 173b 173c, 175a, 175b, and 175c and the exposed portion of the semiconductor 154a, 154b, and 154c.

A color filter 230 is disposed on the first passivation layer 180a.

An overcoat (capping layer) 80 is disposed on the color filter 230.

A pixel electrode 191 including a first subpixel electrode 191a and a second subpixel electrode 191b that are separated from each other and a connection member 97 are disposed on the overcoat 80.

The overall shape of the first subpixel electrode 191a is a polygon shape such as a hexagon, and the first subpixel electrode 191a is enclosed by the second subpixel electrode 191b. The overall shape of the second subpixel electrode 191b is the shape of which four trapezoids are gathered, and is disposed at the edge of the pixel area.

The first subpixel electrode 191a includes a crossed-shape stem (192 and 193) including a transverse stem 192 and a longitudinal stem 193, and a plurality of first branch electrodes 194 extending from the crossed-shape stem (192 and 193).

A first connection 197 connects two adjacent first branch electrodes 194.

The first branch electrodes 194 extend in four different directions. In detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191b includes a plurality of second branch electrodes 196, a plurality of second connections 195a, and a plurality of third connections 195b. The second branch electrodes 196 extend in four different directions. In detail, the second branch electrodes 196 include a plurality of fifth minute branches obliquely extending in the left-upper direction from the plurality of second connections 195a and the plurality of third connections 195b, a plurality of sixth minute branches obliquely extending in the right-upper direction, a plurality of seventh minute branches obliquely extending in the left-lower direction, and a plurality of eighth minute branches obliquely extending in the right-lower direction.

An interval between an end of the first subpixel electrode 191a and an end of the second subpixel electrode 191b adjacent to each other, that is, a separation interval between the first subpixel electrode 191a and the second subpixel electrode 191b, may be about 1 μm to about 5 μm.

A first contact hole 185a exposing a portion of the first drain electrode 175a, a second contact hole 185b exposing a portion of the second drain electrode 175b, and a third contact hole 185c exposing a portion of the third drain electrode 175c and a portion of the expansion 136 are defined in the first passivation layer 180a and the overcoat 80. The connection member 97 is disposed on the third drain electrode 175c and a portion of the expansion 136 exposed through the third contact hole 185c to connect the third drain electrode 175c and the expansion 136 to each other.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive the data voltage from the first drain electrode 175a and the second drain electrode 175b through the first contact hole 185a and the second contact hole 185b.

Now, the upper panel 200 will be described.

A light blocking member 220 and a common electrode 270 are disposed on a second substrate 210 including transparent glass or plastic.

Alignment layers (not shown) may be disposed on an inner surface of the display panels 100 and 200, and the alignment layers may include VA layers.

The liquid crystal layer 3 has negative dielectric anisotropy, and liquid crystal molecules of the liquid crystal layer 3 may be aligned so that long axes thereof are perpendicular with respect to the surface of the two display panels 100 and 200 in a state in which electric field is not generated. Therefore, the incident light does not pass through the crossed polarizers but is blocked in a state in which electric field is not generated.

In an exemplary embodiment, at least one of the liquid crystal layer 3 and the alignment layer may include a photoreactive material, and in detail, a reactive mesogen, for example.

However, in the LCD according to the exemplary embodiment, the shape of the pixel electrode 191 is different from the exemplary embodiment shown in FIGS. 1 and 2. This will be described with reference to FIG. 11.

Referring to FIG. 11, the pixel electrode 191 of the LCD according to the exemplary embodiment includes the first subpixel electrode 191a and the second subpixel electrode 191b.

The overall shape of the first subpixel electrode 191a is the polygon shape such as a hexagon, the first subpixel electrode 191a is enclosed by the second subpixel electrode 191b, and the overall shape of the second subpixel electrode 191b is the shape of which four trapezoids are gathered, and is disposed at the edge of the pixel area.

The first subpixel electrode 191a includes the crossed-shape stem (192 and 193) including the transverse stem 192 and the longitudinal stem 193, the plurality of first branch electrodes 194 extending from the crossed-shape stem (192 and 193), and the plurality of first connections 197.

Each first connection 197 connects two adjacent first branch electrodes 194.

The first branch electrodes 194 extend in four different directions. In detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191b includes the plurality of second branch electrodes 196, the plurality of second connections 195a, and the plurality of third connection 195b. Each second connection 195a connects two adjacent second branch electrodes 196 and is disposed at the edge of the pixel area, and each third connection 195b connects two adjacent second branch electrodes 196 and is disposed at the edge of the second subpixel electrode 191b adjacent to the first subpixel electrode 191a. The plurality of second connections 195a and the plurality of third connections 195b are alternately provided. The second branch electrodes 196 extend in four different directions. In detail, the second branch electrodes 196 include a plurality of fifth minute branches obliquely extending in the left-upper direction from the outer stem 195, a plurality of sixth minute branches obliquely extending in the right-upper direction, a plurality of seventh minute branches obliquely extending in the left-lower direction, and a plurality of eighth minute branches obliquely extending in the right-lower direction.

A plurality of first connections 197 of the first subpixel electrode 191a is disposed at the edge of the first subpixel electrode 191a adjacent to the second subpixel electrode 191a, and a plurality of first connections 197 is disposed to be adjacent to a plurality of third connections 195b of the second subpixel electrode 191b.

All characteristics of the LCD according to the above-described exemplary embodiment of the invention may be applied to all LCDs according to the exemplary embodiment.

Figure 12:
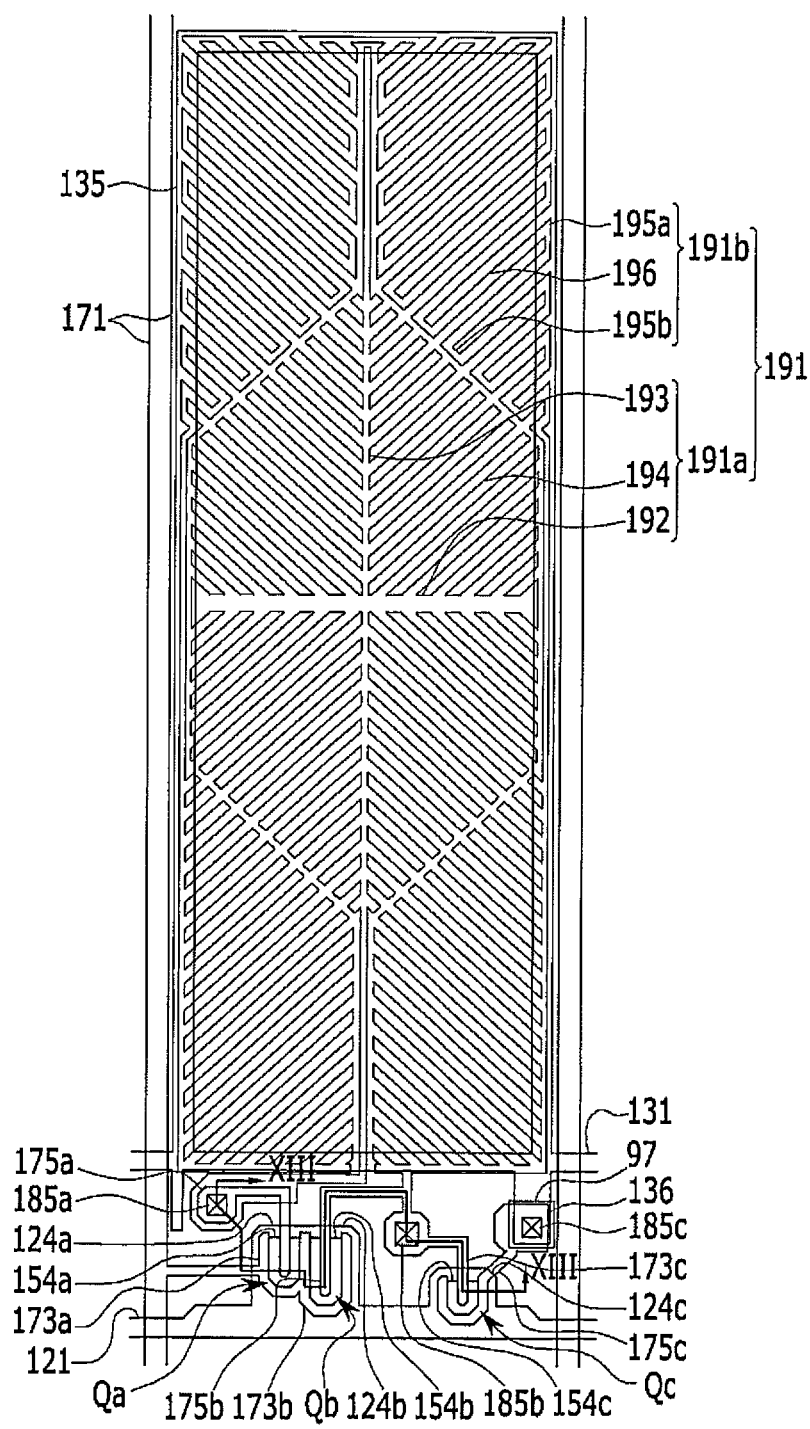
FIG. 12 is a plan view of another exemplary embodiment of an LCD according to the invention.

Next, an LCD according to another exemplary embodiment of the invention will be described with reference to FIGS. 12 to 14. FIG. 12 is a plan view of an LCD according to another exemplary embodiment of the invention, FIG. 13 is a cross-sectional view of the LCD of FIG. 12 taken along line XIII-XIII, and FIG. 14 is a plan view of a pixel electrode of the LCD of FIG. 13.

The LCD according to the exemplary embodiment is similar to the LCD according to the exemplary embodiment described with reference to FIGS. 1 and 2.

Figure 13:
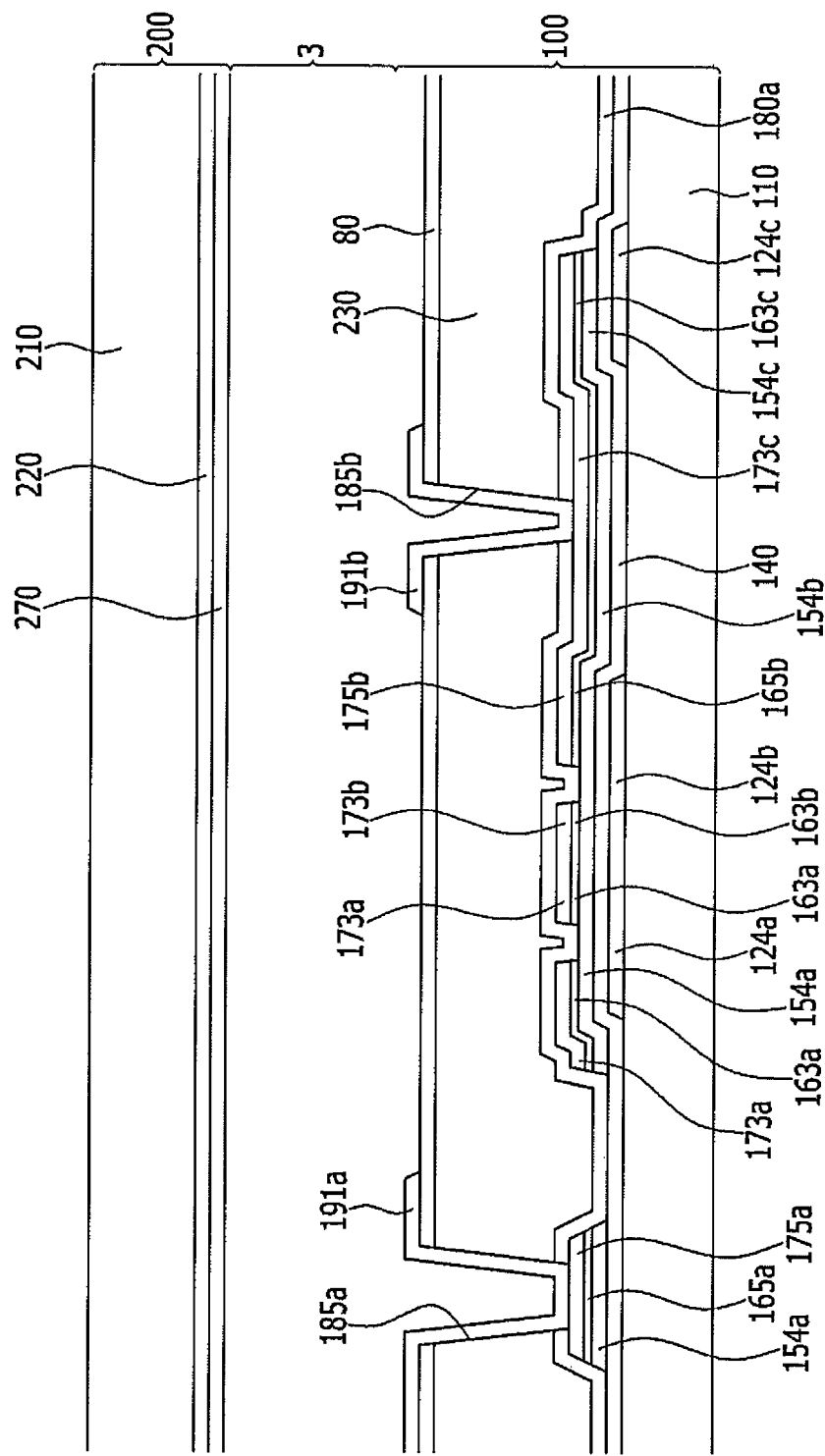
FIG. 13 is a cross-sectional view of the LCD of FIG. 12 taken along line XIII-XIII.
Figure 14:
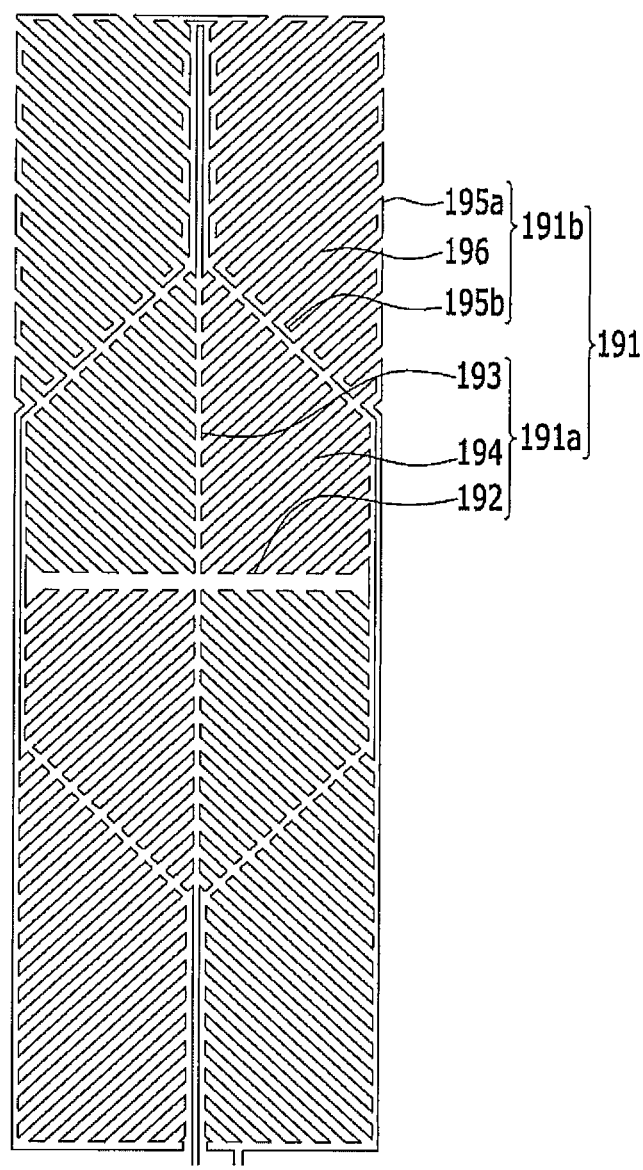
FIG. 14 is a plan view of a pixel electrode of the LCD of FIG. 13.

Referring to FIGS. 12 to 14, the LCD according to the exemplary embodiment includes a lower panel 100 and an upper panel 200 facing each other, and a liquid crystal layer 3 interposed between the two display panels 100 and 200.

Firstly, the lower panel 100 will be described.

A gate line 121, a reference voltage line 131, and a storage electrode 135 are disposed on a first substrate 110. The gate line 121 includes a first gate electrode 124a, a second gate electrode 124b, a third gate electrode 124c, and a wide end (not shown) for connection with other layers or an external driving circuit, and the reference voltage line 131 includes an expansion 136 and the storage electrode 135.

A gate insulating layer 140 is disposed on the gate line 121, the reference voltage line 131, and the storage electrode 135.

A first semiconductor 154a, a second semiconductor 154b, and a third semiconductor 154c are disposed on the gate insulating layer 140.

A plurality of ohmic contacts 163a, 163b, 163c, 165a, and 165b is disposed on the first semiconductor 154a, the second semiconductor 154b, and the third semiconductor 154c.

Data conductors 171, 173a, 173b 173c, 175a, 175b, and 175c including a data line 171 including a first source electrode 173a and a second source electrode 173b, a first drain electrode 175a, a second drain electrode 175b, a third source electrode 173c, and a third drain electrode 175c are disposed on the ohmic contacts 163a, 163b, 163c, 165a, and 165b and the gate insulating layer 140. The second drain electrode 175b is connected to the third source electrode 173c.

The first gate electrode 124a, the first source electrode 173a, and the first drain electrode 175a provide a first TFT Qa along with the first semiconductor 154a, and a channel of the TFT is provided in the semiconductor 154a between the first source electrode 173a and the first drain electrode 175a. Similarly, the second gate electrode 124b, the second source electrode 173b, and the second drain electrode 175b provide a second TFT Qb along with the second semiconductor 154b, and a channel of the TFT is provided in the semiconductor 154b between the second source electrode 173b and the second drain electrode 175b, and the third gate electrode 124c, the third source electrode 173c, and the third drain electrode 175c provide a third TFT Qc along with the third semiconductor Qc, and a channel of the TFT is provided in the semiconductor 154c between the third source electrode 173c and the third drain electrode 175c.

A first passivation layer 180a is disposed on the data conductors 171, 173a, 173b 173c, 175a, 175b, and 175c and the exposed portion of the semiconductors 154a, 154b, and 154c.

A color filter 230 is disposed on the first passivation layer 180a.

An overcoat (capping layer) 80 is disposed on the color filter 230.

A pixel electrode 191 including a first subpixel electrode 191a and a second subpixel electrode 191b that are separated from each other and a connection member 97 are disposed on the overcoat 80.

The overall shape of the first subpixel electrode 191a is a polygon shape such as a hexagon, and the first subpixel electrode 191a is enclosed by the second subpixel electrode 191b. The overall shape of the second subpixel electrode 191b is the shape of which four trapezoids are gathered, and is disposed at the edge of the pixel area.

The first subpixel electrode 191a includes a crossed-shape stem (192 and 193) including a transverse stem 192 and a longitudinal stem 193, and a plurality of first branch electrodes 194 extending from the crossed-shape stem (192 and 193).

The first branch electrodes 194 extend in four different directions. In detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191b includes a plurality of second branch electrodes 196, a plurality of second connections 195a, and a plurality of third connections 195b. The second branch electrodes 196 extend in four different directions. In detail, the second branch electrodes 196 include a plurality of fifth minute branches obliquely extending in the left-upper direction from the plurality of second connections 195a and a plurality of third connections 195b, a plurality of sixth minute branches obliquely extending in the right-upper direction, a plurality of seventh minute branches obliquely extending in the left-lower direction, and a plurality of eighth minute branches obliquely extending in the right-lower direction.

An interval between an end of the first subpixel electrode 191a and an end of the second subpixel electrode 191b adjacent to each other, that is, a separation interval between the first subpixel electrode 191a and the second subpixel electrode 191b, may be about 1 μm to about 5 μm.

A first contact hole 185a exposing a portion of the first drain electrode 175a, a second contact hole 185b exposing a portion of the second drain electrode 175b, and a third contact hole 185c exposing a portion of the third drain electrode 175c and a portion of the expansion 136 are defined in the first passivation layer 180a and the overcoat 80. The connection member 97 is disposed on the third drain electrode 175c and a portion of the expansion 136 exposed through the third contact hole 185c to connect the third drain electrode 175c and the expansion 136 to each other.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive the data voltage from the first drain electrode 175a and the second drain electrode 175b through the first contact hole 185a and the second contact hole 185b.

Now, the upper panel 200 will be described.

A light blocking member 220 and a common electrode 270 are disposed on a second substrate 210 including transparent glass or plastic.

Alignment layers (not shown) may be disposed on an inner surface of the display panels 100 and 200, and the alignment layers may include VA layers.

The liquid crystal layer 3 has negative dielectric anisotropy, and liquid crystal molecules of the liquid crystal layer 3 may be aligned so that long axes thereof are perpendicular with respect to the surface of the two display panels 100 and 200 in a state in which electric field is not generated. Therefore, the incident light does not pass through the crossed polarizers but is blocked in a state in which electric field is not generated.

In an exemplary embodiment, at least one of the liquid crystal layer 3 and the alignment layer may include a photoreactive material, and in detail, a reactive mesogen, for example.

However, in the LCD according to the exemplary embodiment, the shape of the pixel electrode 191 is different from the exemplary embodiment shown in FIGS. 1 and 2. This will be described with reference to FIG. 14.

Referring to FIG. 14, the pixel electrode 191 of the LCD according to the exemplary embodiment includes the first subpixel electrode 191a and the second subpixel electrode 191b.

The overall shape of the first subpixel electrode 191 a is the polygon shape such as a hexagon, the first subpixel electrode 191a is enclosed by the second subpixel electrode 191b, and the overall shape of the second subpixel electrode 191b is the shape of which four trapezoids are gathered, and is disposed at the edge of the pixel area.

The first subpixel electrode 191a includes the crossed-shape stem (192 and 193) including the transverse stem 192 and the longitudinal stem 193 and a plurality of first branch electrodes 194 extending from the crossed-shape stem (192 and 193).

The first branch electrodes 194 extend in four different directions. In detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191b includes a plurality of second branch electrodes 196, a plurality of second connections 195a, and a plurality of third connection 195b. The second connection 195a connects two adjacent second branch electrodes 196 and is disposed at the edge of the pixel area, and the third connection 195b connects two adjacent second branch electrodes 196 and is disposed at the edge of the second subpixel electrode 191b adjacent to the first subpixel electrode 191a. The plurality of second connections 195a and the plurality of third connections 195b are alternately provided. The second branch electrodes 196 extend in four different directions. In detail, the second branch electrodes 196 include a plurality of fifth minute branches obliquely extending in the left-upper direction from the outer stem 195, a plurality of sixth minute branches obliquely extending in the right-upper direction, a plurality of seventh minute branches obliquely extending in the left-lower direction, and a plurality of eighth minute branches obliquely extending in the right-lower direction.

All characteristics of the LCD according to the above-described exemplary embodiment of the invention may be applied to all LCDs according to the exemplary embodiment.

Figure 15:
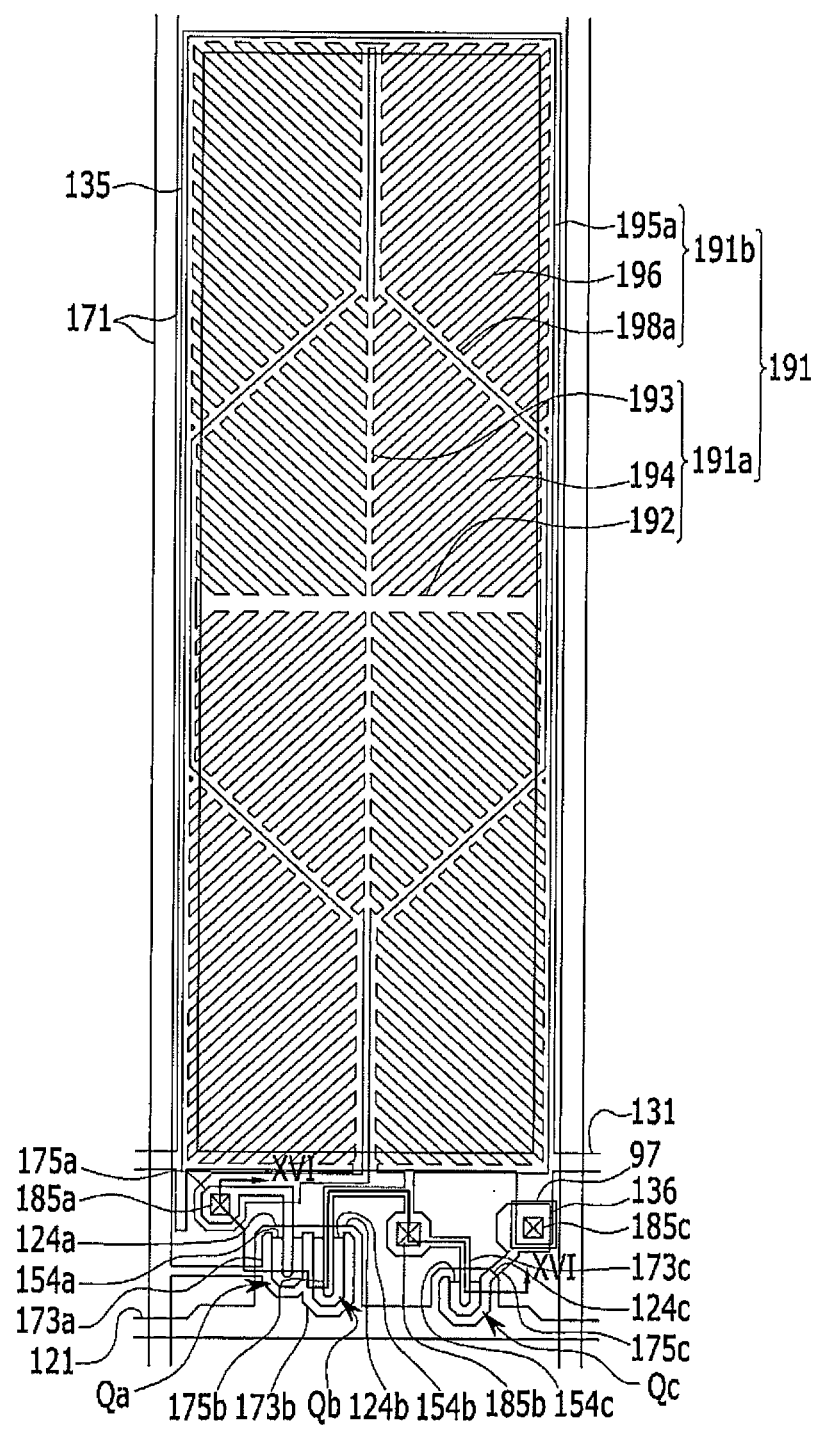
FIG. 15 is a plan view of to another exemplary embodiment of an LCD according the invention.

Next, an LCD according to another exemplary embodiment of the invention will be described with reference to FIGS. 15 to 17. FIG. 15 is a plan view of an LCD according to another exemplary embodiment of the invention, FIG. 16 is a cross-sectional view of the LCD of FIG. 15 taken along line XVI-XVI, and FIG. 17 is a plan view of a pixel electrode of the LCD of FIG. 15.

The LCD according to the exemplary embodiment is similar to the LCD according to the exemplary embodiment described with reference to FIGS. 1 and 2.

Figure 16:
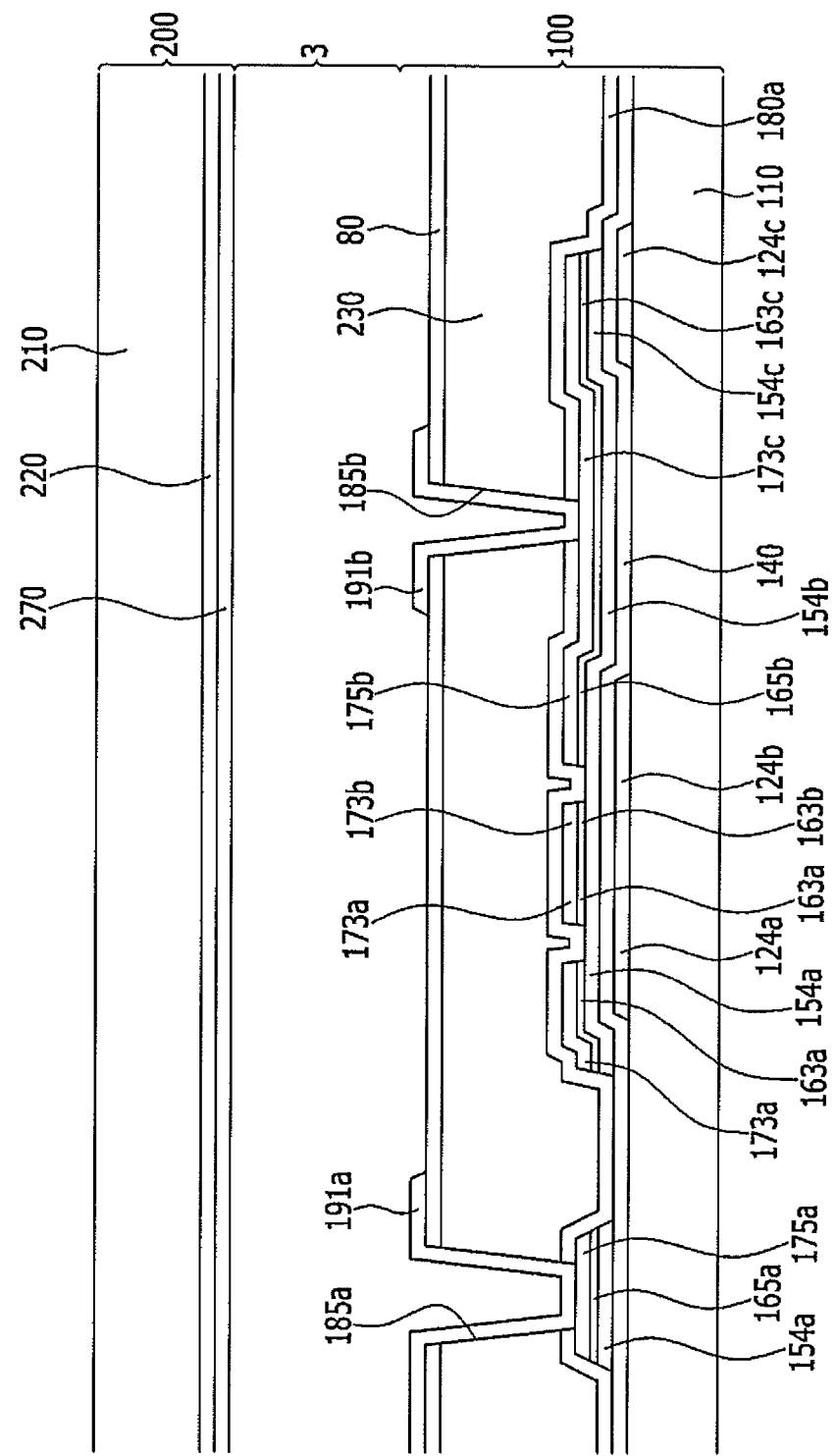
FIG. 16 is a cross-sectional view of the LCD of FIG. 15 taken along line XVI-XVI.
Figure 17:
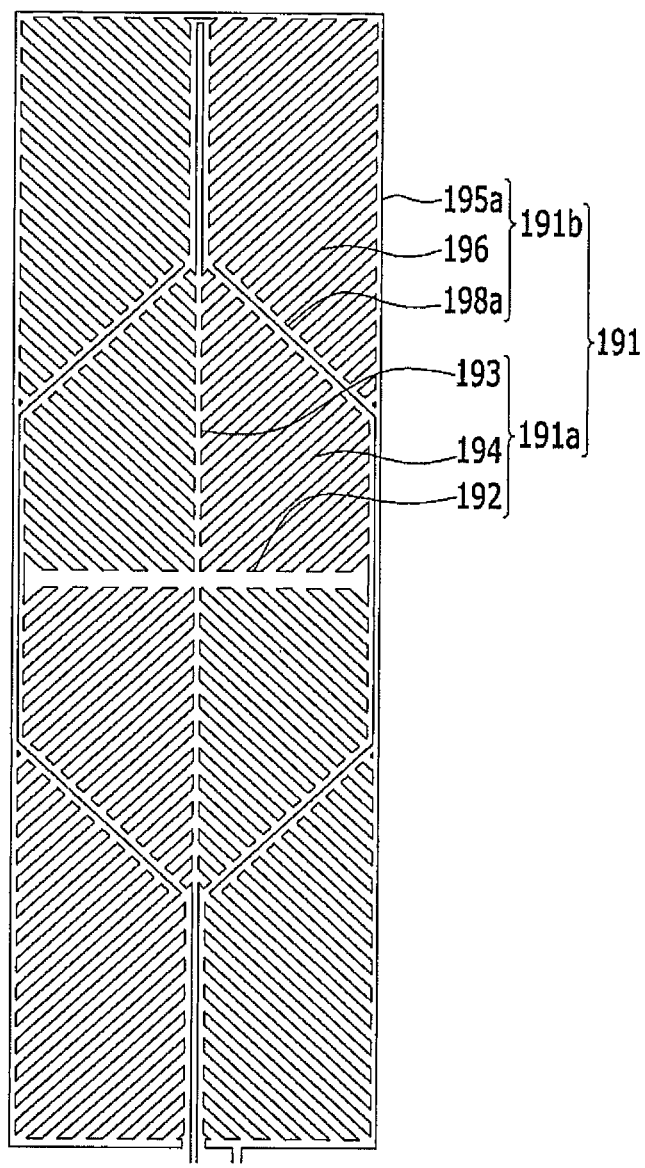
FIG. 17 is a plan view of a pixel electrode of the LCD of FIG. 15.

Referring to FIGS. 15 to 17, the LCD according to the exemplary embodiment includes a lower panel 100 and an upper panel 200 facing each other, and a liquid crystal layer 3 interposed between the two display panels 100 and 200.

Firstly, the lower panel 100 will be described.

A gate line 121, a reference voltage line 131, and a storage electrode 135 are disposed on a first substrate 110. The gate line 121 includes a first gate electrode 124a, a second gate electrode 124b, a third gate electrode 124c, and a wide end (not shown) for connection with other layers or an external driving circuit, and the reference voltage line 131 includes an expansion 136 and the storage electrode 135.

A gate insulating layer 140 is disposed on the gate line 121, the reference voltage line 131, and the storage electrode 135.

A first semiconductor 154a, a second semiconductor 154b, and a third semiconductor 154c are disposed on the gate insulating layer 140.

A plurality of ohmic contacts 163a, 163b, 163c, 165a, and 165b is disposed on the first semiconductor 154a, the second semiconductor 154b, and the third semiconductor 154c.

Data conductors 171, 173a, 173b 173c, 175a, 175b, and 175c including a data line 171 including a first source electrode 173a and a second source electrode 173b, a first drain electrode 175a, a second drain electrode 175b, a third source electrode 173c, and a third drain electrode 175c are disposed on the ohmic contacts 163a, 163b, 163c, 165a, and 165b and the gate insulating layer 140. The second drain electrode 175b is connected to the third source electrode 173c.

The first gate electrode 124a, the first source electrode 173a, and the first drain electrode 175a provide a first TFT Qa along with the first semiconductor 154a, and a channel of the TFT is provided in the semiconductor 154a between the first source electrode 173a and the first drain electrode 175a. Similarly, the second gate electrode 124b, the second source electrode 173b, and the second drain electrode 175b provide a second TFT Qb along with the second semiconductor 154b, and a channel of the TFT is provided in the semiconductor 154b between the second source electrode 173b and the second drain electrode 175b, and the third gate electrode 124c, the third source electrode 173c, and the third drain electrode 175c provide a third TFT Qc along with the third semiconductor Qc, and a channel of the TFT is provided in the semiconductor 154c between the third source electrode 173c and the third drain electrode 175c.

A first passivation layer 180a is disposed on the data conductors 171, 173a, 173b 173c, 175a, 175b, and 175c and the exposed portion of the semiconductor 154a, 154b, and 154c.

A color filter 230 is disposed on the first passivation layer 180a.

An overcoat (capping layer) 80 is disposed on the color filter 230.

A pixel electrode 191 including a first subpixel electrode 191a and a second subpixel electrode 191b that are separated from each other and a connection member 97 are disposed on the overcoat 80.

The overall shape of the first subpixel electrode 191a is a polygon shape such as a hexagon, and the first subpixel electrode 191a is enclosed by the second subpixel electrode 191b. The overall shape of the second subpixel electrode 191b is the shape of which four trapezoids are gathered, and is disposed at the edge of the pixel area.

The first subpixel electrode 191a includes a crossed-shape stem (192 and 193) including a transverse stem 192 and a longitudinal stem 193 and a plurality of first branch electrodes 194 extending from the crossed-shape stem (192 and 193).

The first branch electrodes 194 extend in four different directions. In detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191b includes an outer stem 195a disposed at the edge of the pixel area, a first stem 198a disposed at the edge adjacent to the first subpixel electrode 191a, and a plurality of second branch electrodes 196 extending from the outer stem 195a and the first stem 198a. The second branch electrodes 196 extend in four different directions. In detail, the second branch electrodes 196 include a plurality of fifth minute branches obliquely extending in the left-upper direction from the outer stem 195a, a plurality of sixth minute branches obliquely extending in the right-upper direction, a plurality of seventh minute branches obliquely extending in the left-lower direction, and a plurality of eighth minute branches obliquely extending in the right-lower direction.

An interval between an end of the first subpixel electrode 191a and an end of the second subpixel electrode 191b adjacent to each other, that is, a separation interval between the first subpixel electrode 191a and the second subpixel electrode 191b, may be about 1 μm to about 5 μm.

A first contact hole 185a exposing a portion of the first drain electrode 175a, a second contact hole 185b exposing a portion of the second drain electrode 175b, and a third contact hole 185c exposing a portion of the third drain electrode 175c and a portion of the expansion 136 are defined in the first passivation layer 180a and the overcoat 80. The connection member 97 is disposed on the third drain electrode 175c and a portion of the expansion 136 exposed through the third contact hole 185c to connect the third drain electrode 175c and the expansion 136 to each other.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive the data voltage from the first drain electrode 175a and the second drain electrode 175b through the first contact hole 185a and the second contact hole 185b.

Now, the upper panel 200 will be described.

A light blocking member 220 and a common electrode 270 are disposed on a second substrate 210 including transparent glass or plastic.

Alignment layers (not shown) may be disposed on an inner surface of the display panels 100 and 200, and the alignment layers may include VA layers.

The liquid crystal layer 3 has negative dielectric anisotropy, and liquid crystal molecules of the liquid crystal layer 3 may be aligned so that long axes thereof are perpendicular with respect to the surface of the two display panels 100 and 200 in a state in which there is electric field is not generated. Therefore, the incident light does not pass through the crossed polarizers but is blocked in a state in which electric field is not generated.

In an exemplary embodiment, at least one of the liquid crystal layer 3 and the alignment layer may include a photoreactive material, and in detail, a reactive mesogen, for example.

However, in the LCD according to the exemplary embodiment, the shape of the pixel electrode 191 is different from the exemplary embodiment shown in FIGS. 1 and 2. This will be described with reference to FIG. 17.

Referring to FIG. 17, the pixel electrode 191 of the LCD according to the exemplary embodiment includes the first subpixel electrode 191a and the second subpixel electrode 191b.

The overall shape of the first subpixel electrode 191a is the polygon shape such as the hexagon, the first subpixel electrode 191 a is enclosed by the second subpixel electrode 191b, and the overall shape of the second subpixel electrode 191b is the shape of which four trapezoids are gathered, and is disposed at the edge of the pixel area.

The first subpixel electrode 191a includes the crossed-shape stem (192 and 193) including the transverse stem 192 and the longitudinal stem 193, and the plurality of first branch electrodes 194 extending from the crossed-shape stem (192 and 193).

The first branch electrodes 194 extend in four different directions. In detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191b includes an outer stem 195 disposed at the edge of the pixel area, a first stem 198a disposed at the edge adjacent to the first subpixel electrode 191a, and a plurality of second branch electrodes 196 extending from the outer stem 195 and the first stem 198a. The second branch electrodes 196 extend in four different directions. In detail, the second branch electrodes 196 include a plurality of fifth minute branches obliquely extending in the left-upper direction from the outer stem 195, a plurality of sixth minute branches obliquely extending in the right-upper direction, a plurality of seventh minute branches obliquely extending in the left-lower direction, and a plurality of eighth minute branches obliquely extending in the right-lower direction.

All characteristics of the LCD according to the above-described exemplary embodiment of the invention may be applied to all LCDs according to the exemplary embodiment.

Figure 18:
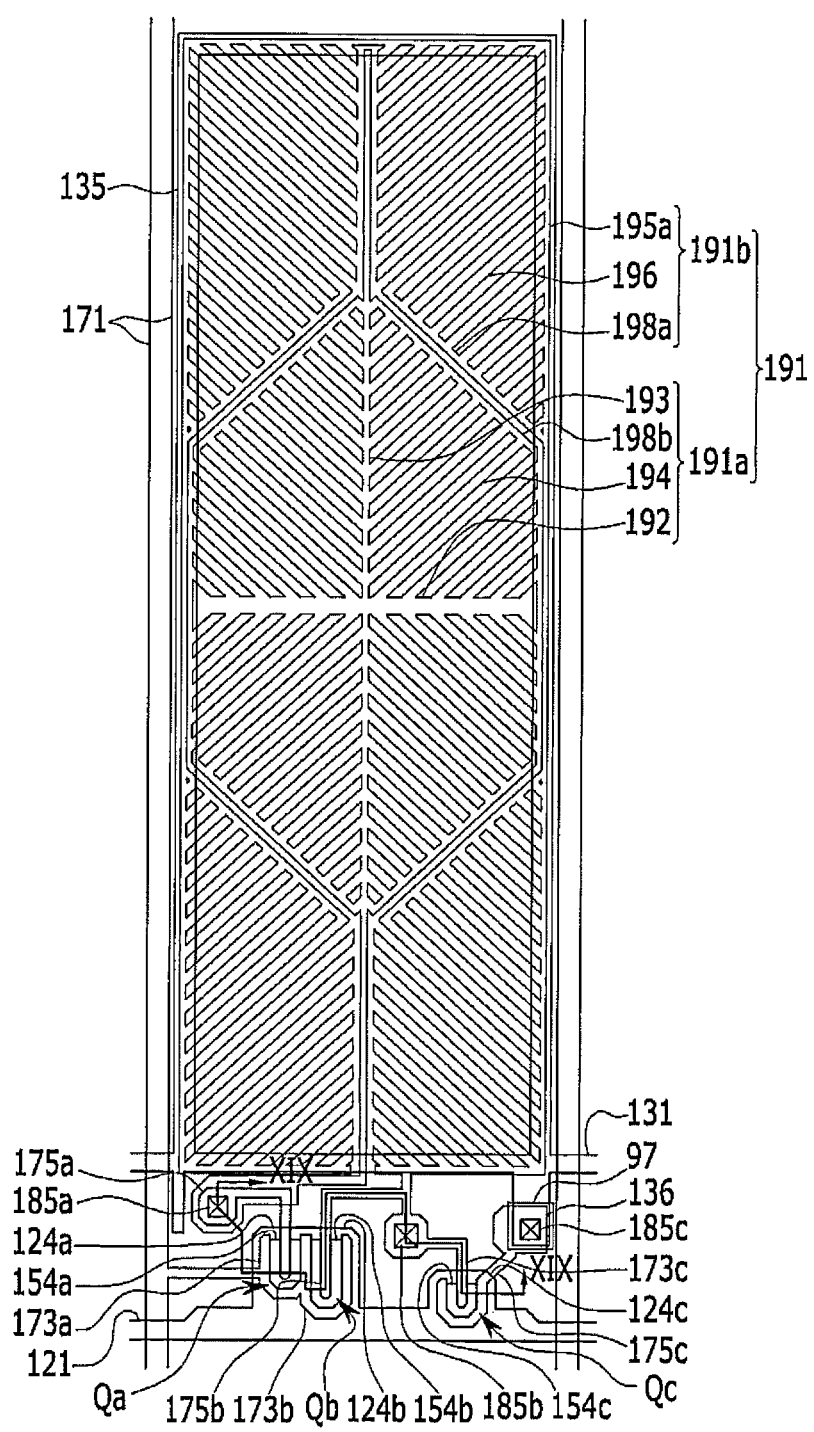
FIG. 18 is a plan view of another exemplary embodiment of an LCD according to the invention.

Next, an LCD according to another exemplary embodiment of the invention will be described with reference to FIGS. 18 to 20. FIG. 18 is a plan view of an LCD according to another exemplary embodiment of the invention, FIG. 19 is a cross-sectional view of the LCD of FIG. 18 taken along line XIX-XIX, and FIG. 20 is a plan view of a pixel electrode of the LCD of FIG. 18.

The LCD according to the exemplary embodiment is similar to the LCD according to the exemplary embodiment described with reference to FIGS. 1 and 2.

Figure 19:
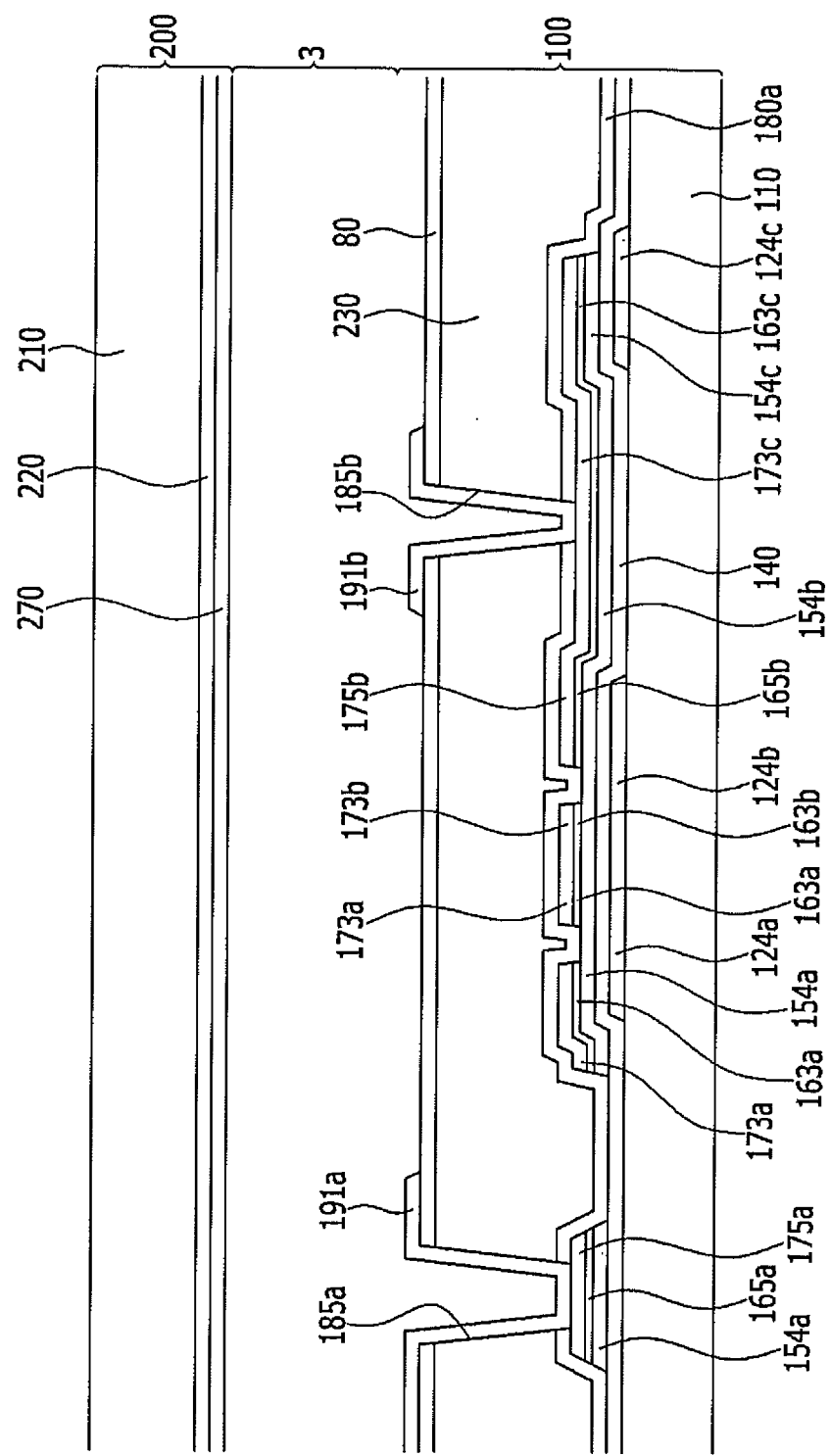
FIG. 19 is a cross-sectional view of the LCD of FIG. 18 taken along line XIX-XIX.
Figure 20:
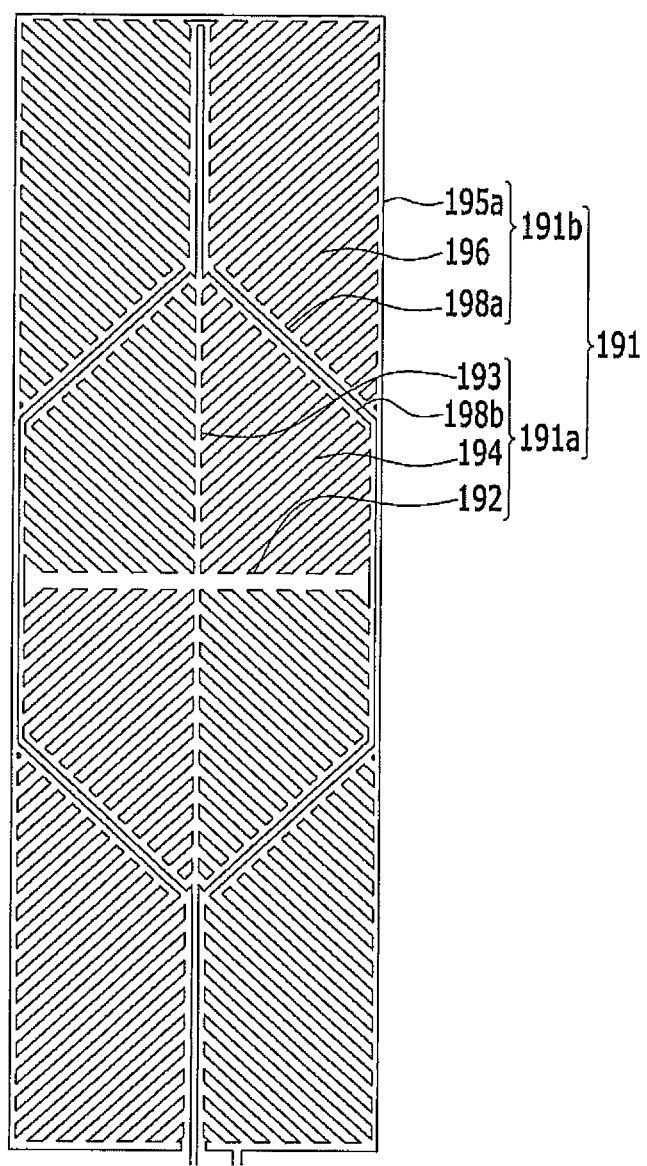
FIG. 20 is a plan view of a pixel electrode of the LCD of FIG. 18.

Referring to FIGS. 18 to 20, the LCD according to the exemplary embodiment includes a lower panel 100 and an upper panel 200 facing each other, and a liquid crystal layer 3 interposed between the two display panels 100 and 200.

Firstly, the lower panel 100 will be described.

A gate line 121, a reference voltage line 131, and a storage electrode 135 are disposed on a first substrate 110. The gate line 121 includes a first gate electrode 124a, a second gate electrode 124b, a third gate electrode 124c, and a wide end (not shown) for connection with other layers or an external driving circuit, and the reference voltage line 131 includes an expansion 136 and the storage electrode 135.

A gate insulating layer 140 is disposed on the gate line 121, the reference voltage line 131, and the storage electrode 135.

A first semiconductor 154a, a second semiconductor 154b, and a third semiconductor 154c are disposed on the gate insulating layer 140.

A plurality of ohmic contacts 163a, 163b, 163c, 165a, and 165b is disposed on the first semiconductor 154a, the second semiconductor 154b, and the third semiconductor 154c.

Data conductors 171, 173a, 173b 173c, 175a, 175b, and 175c including a data line 171 including a first source electrode 173a and a second source electrode 173b, a first drain electrode 175a, a second drain electrode 175b, a third source electrode 173c, and a third drain electrode 175c are disposed on the ohmic contacts 163a, 163b, 163c, 165a, and 165b and the gate insulating layer 140. The second drain electrode 175b is connected to the third source electrode 173c.

The first gate electrode 124a, the first source electrode 173a, and the first drain electrode 175a provide a first TFT Qa along with the first semiconductor 154a, and a channel of the TFT is provided in the semiconductor 154a between the first source electrode 173a and the first drain electrode 175a. Similarly, the second gate electrode 124b, the second source electrode 173b, and the second drain electrode 175b provide a second TFT Qb along with the second semiconductor 154b, and a channel of the TFT is provided in the semiconductor 154b between the second source electrode 173b and the second drain electrode 175b, and the third gate electrode 124c, the third source electrode 173c, and the third drain electrode 175c provide a third TFT Qc along with the third semiconductor Qc, and a channel of the TFT is provided in the semiconductor 154c between the third source electrode 173c and the third drain electrode 175c.

A first passivation layer 180a is disposed on the data conductors 171, 173a, 173b 173c, 175a, 175b, and 175c and the exposed portion of the semiconductors 154a, 154b, and 154c.

A color filter 230 is disposed on the first passivation layer 180a.

An overcoat (capping layer) 80 is disposed on the color filter 230.

A pixel electrode 191 including a first subpixel electrode 191a and a second subpixel electrode 191b that are separated from each other and a connection member 97 are disposed on the overcoat 80.

The overall shape of the first subpixel electrode 191a is a polygon shape such as a hexagon, and the first subpixel electrode 191a is enclosed by the second subpixel electrode 191b. The overall shape of the second subpixel electrode 191b is the shape of which four trapezoids are gathered, and is disposed at the edge of the pixel area.

The first subpixel electrode 191a includes a crossed-shape stem (192 and 193) including a transverse stem 192 and a longitudinal stem 193 and a plurality of first branch electrodes 194 extending from the crossed-shape stem (192 and 193). The first subpixel electrode 191 a is disposed at the edge adjacent to the second subpixel electrode 191b, and includes a second stem 198b connecting a plurality of first branch electrodes 194 to each other.

The first branch electrodes 194 extend in four different directions. In detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191b includes an outer stem 195a disposed at the edge of the pixel area, a first stem 198a disposed at the edge adjacent to the first subpixel electrode 191a, and a plurality of second branch electrodes 196 extending from the outer stem 195a and the first stem 198a. The second branch electrodes 196 extend in four different directions. In detail, the second branch electrodes 196 include a plurality of fifth minute branches obliquely extending in the left-upper direction from the outer stem 195, a plurality of sixth minute branches obliquely extending in the right-upper direction, a plurality of seventh minute branches obliquely extending in the left-lower direction, and a plurality of eighth minute branches obliquely extending in the right-lower direction.

An interval between an end of the first subpixel electrode 191a and an end of the second subpixel electrode 191b adjacent to each other, that is, a separation interval between the first subpixel electrode 191a and the second subpixel electrode 191b, may be about 1 µm to about 5 µm.

A first contact hole 185a exposing a portion of the first drain electrode 175a, a second contact hole 185b exposing a portion of the second drain electrode 175b, and a third contact hole 185c exposing a portion of the third drain electrode 175c and a portion of the expansion 136 are defined in the first passivation layer 180a and the overcoat 80. The connection member 97 is disposed on the third drain electrode 175c and a portion of the expansion 136 exposed through the third contact hole 185c to connect the third drain electrode 175c and the expansion 136 to each other.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive the data voltage from the first drain electrode 175a and the second drain electrode 175b through the first contact hole 185a and the second contact hole 185b.

Now, the upper panel 200 will be described.

A light blocking member 220 and a common electrode 270 are disposed on a second substrate 210 including transparent glass or plastic.

Alignment layers (not shown) may be disposed on an inner surface of the display panels 100 and 200, and the alignment layers may include VA layers.

The liquid crystal layer 3 has negative dielectric anisotropy, and liquid crystal molecules of the liquid crystal layer 3 may be aligned so that long axes thereof are perpendicular with respect to the surface of the two display panels 100 and 200 in a state in which electric field is not generated. Therefore, the incident light does not pass through the crossed polarizers but is blocked in a state in which electric field is not generated.

In an exemplary embodiment, at least one of the liquid crystal layer 3 and the alignment layer may include a photoreactive material, and in detail, a reactive mesogen, for example.

However, in the LCD according to the exemplary embodiment, the shape of the pixel electrode 191 is different from the exemplary embodiment shown in FIGS. 1 and 2. This will be described with reference to FIG. 20.

Referring to FIG. 20, the pixel electrode 191 of the LCD according to the exemplary embodiment includes the first subpixel electrode 191a and the second subpixel electrode 191b.

The overall shape of the first subpixel electrode 191a is a polygon shape such as a hexagon, the first subpixel electrode 191a is enclosed by the second subpixel electrode 191b, and the overall shape of the second subpixel electrode 191b is the shape of which four trapezoids are gathered, and is disposed at the edge of the pixel area.

The first subpixel electrode 191a includes the crossed-shape stem (192 and 193) including the transverse stem 192 and the longitudinal stem 193, and a plurality of first branch electrodes 194 extending from the crossed-shape stem (192 and 193). The first subpixel electrode 191a is disposed at the edge adjacent to the second subpixel electrode 191b, and includes a second stem 198b connecting a plurality of first branch electrodes 194 to each other.

The first branch electrodes 194 extend in four different directions. In detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191b includes an outer stem 195 disposed at the edge of the pixel area, a first stem 198a disposed at the edge adjacent to the first subpixel electrode 191a, and a plurality of second branch electrodes 196 extending from the outer stem 195 and the first stem 198a. The second branch electrodes 196 extend in four different directions. In detail, the second branch electrodes 196 include a plurality of fifth minute branches obliquely extending in the left-upper direction from the outer stem 195, a plurality of sixth minute branches obliquely extending in the right-upper direction, a plurality of seventh minute branches obliquely extending in the left-lower direction, and a plurality of eighth minute branches obliquely extending in the right-lower direction.

The second stem 198b of the first subpixel electrode 191a is disposed to be adjacent to the first stem 198a of the second subpixel electrode 191b.

All characteristics of the LCD according to the above-described exemplary embodiment of the invention may be applied to all LCDs according to the exemplary embodiment.

Figure 21:
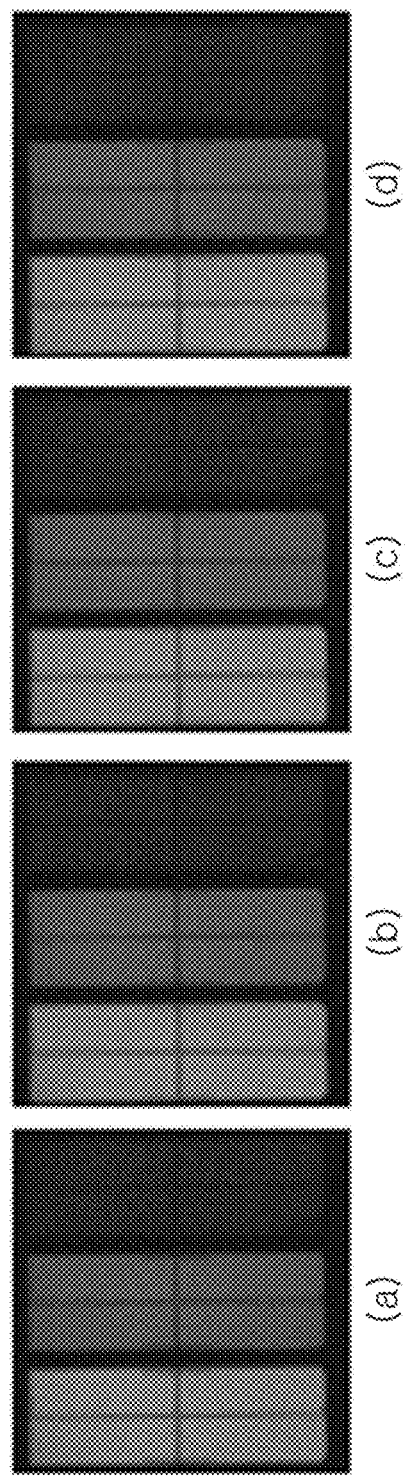
FIG. 21 is an electron microscope photograph showing an experimental example of a transmittance change of an LCD according to the invention.
Figure 22:
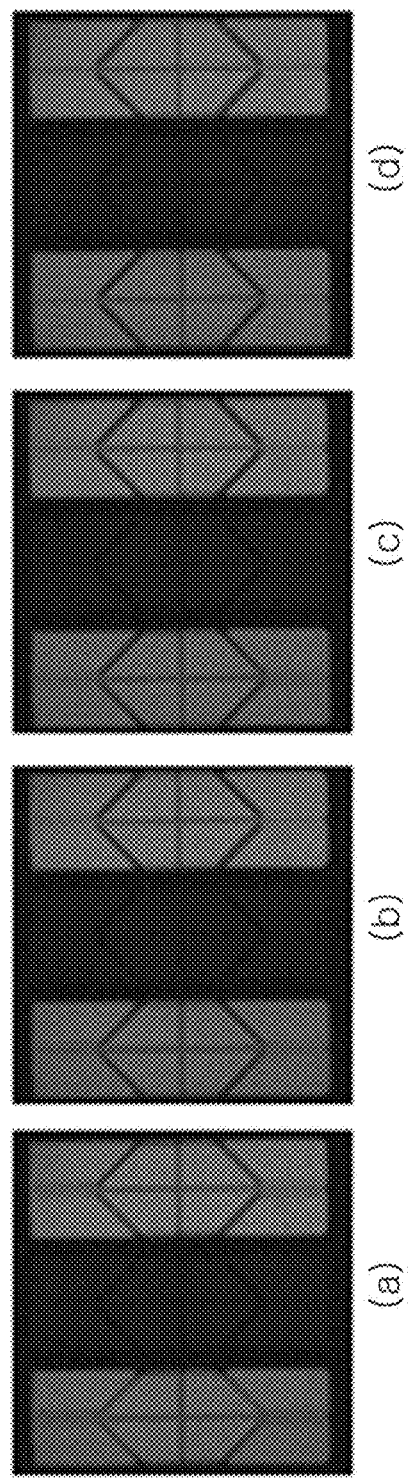
FIG. 22 is an electron microscope photograph showing an experimental example of a transmittance change of an LCD according to the invention.
Figure 23:
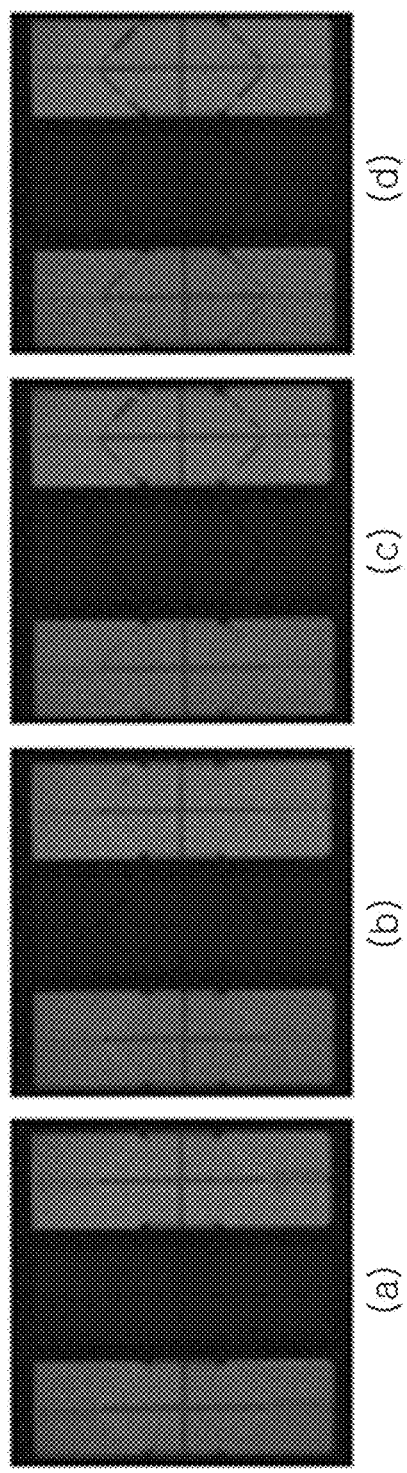
FIG. 23 is an electron microscope photograph showing an experimental example of a transmittance change of an LCD according to the invention.

Another experimental example of the invention will now be described with reference to FIGS. 21 to 23. FIGS. 21 to 23 are electron microscope photographs showing a transmittance change of an LCD according to an experimental example of the invention.

In the experimental example, a plurality of pixels according to the LCD according to the exemplary embodiment shown in FIGS. 1 and 2 are provided, a plurality of pixels according to the LCD according to the exemplary embodiment shown in FIGS. 15 and 17 are provided, and a plurality of pixels according to the LCD according to the exemplary embodiment shown in FIGS. 18 and 20 are provided, and for each case, while controlling the ratio of the voltage applied to the second subpixel electrode 191b to the voltage applied to the first subpixel electrode 191a, the transmittance result is measured.

FIG. 21 shows a result of a case that a plurality of pixels according to the LCD according to the exemplary embodiment shown in FIGS. 1 and 2 are provided, FIG. 22 shows a result of a case that a plurality of pixels according to the LCD according to the exemplary embodiment shown in FIGS. 15 and 17 are provided, and FIG. 23 shows a result of a case that a plurality of pixels according to the LCD according to the exemplary embodiment shown in FIGS. 18 and 20 are provided.

In FIGS. 21 to 23, (a) shows a case that the magnitude of the voltage applied to the first subpixel electrode 191a is about 9.5 V and the magnitude of the voltage applied to the second subpixel electrode 191a is about 5.5 V, (b) shows a case that the magnitude of the voltage applied to the first subpixel electrode 191a is about 12 V and the magnitude of the voltage applied to the second subpixel electrode 191a is about 7.6 V, (c) shows a case that the magnitude of the voltage applied to the first subpixel electrode 191a is about 14.5 V and the magnitude of the voltage applied to the second subpixel electrode 191a is about 10.8 V, and (d) shows a case that the magnitude of the voltage applied to the first subpixel electrode 191a is about 17.0 V and the magnitude of the voltage applied to the second subpixel electrode 191a is about 12.8 V.

Referring to FIGS. 21 to 23, the LCD according to the exemplary embodiments of the invention has high transmittance except for the boundary portion between the first subpixel electrode 191a and the second subpixel electrode 191b.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
a first substrate;
a pixel electrode which is disposed on the first substrate and comprises:
a first subpixel electrode which is disposed at a pixel area and includes a plurality of first branch electrodes; and
a second subpixel electrode which is separated from the first subpixel electrode, disposed at an outer edge of the pixel area, encloses the first subpixel electrode and includes a plurality of second branch electrodes;
a second substrate facing the first substrate;
a common electrode disposed on the second substrate; and
a liquid crystal layer disposed between the first substrate and the second substrate,
wherein the plurality of second branch electrodes extends in four different directions from the outer stem which surrounds four outer sides of the second subpixel electrode, and
wherein a first voltage applied to the first subpixel electrode is larger than a second voltage applied to the second subpixel electrode.

2. The liquid crystal display of claim 1, wherein
a separation interval between the first subpixel electrode and the second subpixel electrode is about 1 micrometer to about 5 micrometers.

3. The liquid crystal display of claim 2, wherein
the separation interval between the first subpixel electrode and the second subpixel electrode is about 3.0 micrometers, and
a ratio of the second voltage to the first voltage is less than about 0.9.

4. The liquid crystal display of claim 2, wherein
the separation interval between the first subpixel electrode and the second subpixel electrode is about 4.0 micrometers, and
a ratio of the second voltage to the first voltage is less than about 0.8.

5. The liquid crystal display of claim 2, wherein
the separation interval between the first subpixel electrode and the second subpixel electrode is about 5.0 micrometers, and
a ratio of the second voltage to the first voltage is less than about 0.7.

6. The liquid crystal display of claim 2, wherein
an overall shape of the first subpixel electrode is a polygon shape including a hexagon, and
an overall shape of the second subpixel electrode is a shape including four trapezoids.

7. The liquid crystal display of claim 6, wherein
the first subpixel electrode further includes a crossed-shape stem including a transverse stem and a longitudinal stem, and
the plurality of first branch electrodes extends from the crossed-shape stem in four different directions.

8. The liquid crystal display of claim 7, wherein
the second subpixel electrode further includes a first stem disposed at an edge of the second subpixel electrode adjacent to the first subpixel electrode, and
the plurality of second branch electrodes extends from the first stem in the four different directions.

9. The liquid crystal display of claim 8, wherein
the first subpixel electrode further include a second stem disposed at an edge of the first subpixel electrode adjacent to the second subpixel electrode, and
the plurality of first branch electrodes extends from the crossed-shape stem and the second stem in the four different directions.

10. The liquid crystal display of claim 7, wherein
the second subpixel electrode further includes a plurality of first connections disposed at the outer edge of the pixel area and connecting two adjacent second branch electrodes among the plurality of second branch electrodes.

11. The liquid crystal display of claim 10, wherein
the second subpixel electrode further includes a plurality of second connections disposed at an edge of the second subpixel electrode adjacent to the first subpixel electrode and connecting the two adjacent second branch electrodes among the plurality of second branch electrodes, and
the plurality of first connections and the plurality of second connections are alternately disposed in a plan view.

12. The liquid crystal display of claim 11, wherein
the first subpixel electrode further includes a plurality of third connections disposed at an edge of the first subpixel electrode adjacent to the second subpixel electrode and connecting two adjacent first branch electrodes among the plurality of first branch electrodes, and
the plurality of second connections and the plurality of third connections are adjacent.

* * * * *